(12) United States Patent
Kanbayashi

(10) Patent No.: US 7,337,397 B2
(45) Date of Patent: Feb. 26, 2008

(54) SEPARATION, TRANSMISSION AND DISPLAY OF CHARACTER AND NON-CHARACTER DATA

(75) Inventor: Hideyuki Kanbayashi, Sagamihara (JP)

(73) Assignee: Minolta Co., Ltd., Osaka-Shi, Osaka (JP)

( * ) Notice: Subject to any disclaimer, the term of this patent is extended or adjusted under 35 U.S.C. 154(b) by 639 days.

(21) Appl. No.: 10/147,080

(22) Filed: May 17, 2002

(65) Prior Publication Data

US 2002/0175928 A1    Nov. 28, 2002

(30) Foreign Application Priority Data

May 22, 2001    (JP) .............................. 2001-153018

(51) Int. Cl.
*G06F 17/00*    (2006.01)
(52) U.S. Cl. ..................................... 715/526; 715/100
(58) Field of Classification Search ................. 715/523, 715/526; 382/176
See application file for complete search history.

(56) References Cited

U.S. PATENT DOCUMENTS

| | | | | |
|---|---|---|---|---|
| 6,072,598 | A * | 6/2000 | Tso | 358/442 |
| 6,195,459 | B1 * | 2/2001 | Zhu | 382/176 |
| 6,278,791 | B1 * | 8/2001 | Honsinger et al. | 382/100 |
| 6,400,845 | B1 * | 6/2002 | Volino | 382/176 |
| 6,535,896 | B2 * | 3/2003 | Britton et al. | 715/523 |
| 6,735,740 | B2 * | 5/2004 | Sakai et al. | 715/526 |
| 6,748,111 | B1 * | 6/2004 | Stolin et al. | 382/176 |
| 6,798,906 | B1 * | 9/2004 | Kato | 382/176 |
| 6,915,484 | B1 * | 7/2005 | Ayers et al. | 715/517 |
| 2002/0113125 | A1 * | 8/2002 | Schuessler et al. | 235/462.1 |
| 2002/0131636 | A1 * | 9/2002 | Hou | 382/181 |
| 2003/0014445 | A1 * | 1/2003 | Formanek et al. | 707/526 |
| 2005/0036657 | A1 * | 2/2005 | Rhoads et al. | 382/100 |

FOREIGN PATENT DOCUMENTS

| | | |
|---|---|---|
| JP | 05323941 | 12/1993 |
| JP | 07064997 | 3/1995 |
| JP | 08251550 | 9/1996 |

OTHER PUBLICATIONS

"JPEG Header Information" found at www.obrador.com/essentialjpeg/headerinfo.htm, Copyright 1998.*

* cited by examiner

*Primary Examiner*—Stephen Hong
*Assistant Examiner*—Adam M. Queler
(74) *Attorney, Agent, or Firm*—Buchanan Ingersoll & Rooney PC

(57) ABSTRACT

A portable terminal receives document data from a data transmission device, separates character area and non-character area from the received document data, designates a display method for data in correspondence with each area, and outputs to display the document data as a non-character display data and a text data on the screen of the display unit according to the designated display method.

38 Claims, 32 Drawing Sheets

```
BEGINE_
Display1,30,30,1630,1630,10%,100%,photo,
Display2,30,1650,1630,2580,25%,50%,photo,
Display3,1660,30,2460,2830,50%,100%,text"ABCD·····",
Display4,30,2870,2430,3470,25%,75%,photo,
END
```

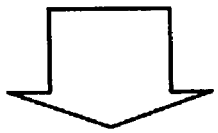

501

```
424547494E45・・・・・・・・・・・・・・・・・・・・・・・・・・・・・・・・・・・・・・・・・・
・・・・・・・・・・・・・・・・・・・・・・・・・・・・・・・・・・・・・・・・・・・・・・・・・・・・・・
・・・・・・・・・・・・・・・・・・・・・・・・・・・・・・・・・・・・・・・・・・・・・・・・・・・・・・
・・・・・・・・・・・・・・・・・・・・・・・・・・・・・・・・・・・・・・・・・・・・・・・・・・・・・・
・・・・・・・・・・・・・・・・・・・・・・・・・・・・・・・・・・・・・・・・・・・・・・・・・・・・・・
```

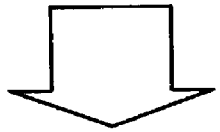

502

```
BEGINE_
Display1,30,30,1630,1630,10%,100%,photo,
Display2,30,1650,1630,2580,25%,50%,photo,
Display3,1660,30,2460,2830,50%,100%,text"ABCD・・・・・",
Display4,30,2870,2430,3470,25%,75%,photo,
END
```

SEPARATION, TRANSMISSION AND DISPLAY OF CHARACTER AND NON-CHARACTER DATA

This application is based on Japanese Patent Application No. 2001-153018 filed on May 22, 2001, the contents of which are hereby incorporated by reference.

BACKGROUND OF THE INVENTION

1. Field of the Invention

The invention relates to a data display system, a data transmission device, a portable terminal, a data display method, a data display program, and a computer readable recording medium storing a data display program.

2. Description of the Related Art

Various portable terminals such as cellular phones and PDA (personal digital assistant) have become very popular in recent years. Moreover, the importance of portable terminals as sending and receiving terminals for electronic data has increased substantially with the development of information technology.

A portable terminal can receive not only electronic data consisting mainly of character data but also image data, e.g., photographs, and display them on its display unit screen.

However, there has been a problem that the display unit screen of a portable terminal is so small that the receiving side user has a difficulty in recognizing the document data clearly if the received document data consists of a mixture of character data, photographic data, graphic data, etc. Although it may be possible to reduce the entire document data size in such a case, it may cause a difficulty in reading characters. Also, it may be possible to display the entire document data by scrolling, but it may make it difficult to understand the entire contents.

SUMMARY OF THE INVENTION

It is an object of the invention to provide a data display system, a data transmission device, a portable terminal, a data display method, and a computer readable recording medium storing a data display program, which are improved for solving the above-mentioned problems.

It is a further object of the present invention to provide a data display system, a data transmission device, a portable terminal, a data display method, a data display program, and a computer readable recording medium storing a data display program capable of displaying document data on the display unit of the portable terminal so that the receiving side user can clearly recognize the contents even when the document data is received by the portable terminal consists of a mixture of character data, photographic data, graphic data, etc.

According to an aspect of the invention, there is provided a data display system comprising: a portable terminal having a communication function; and a data transmission device capable of communicating with the portable terminal, wherein the data display system is intended for displaying data transmitted by the data transmission device on the portable terminal, the data transmission device including an area separation means for separating character area where character data exists and a non-character area where non-character data exists from document data containing character data and non-character data other than characters for transmission to the portable terminal, a display method designating means for designating a display method for data at the portable terminal in correspondence with each separated area, a designating information adding means for adding designating information concerning the display method to the document data, and a transmitting means for transmitting the document data to the portable terminal, the portable terminal including a receiving means for receiving the document data from the data transmission device, a designating information detecting means for detecting the designating information from the document data, and a display means for displaying the document data as an output image based on the designating information.

Therefore, it is possible to separate character area and non-character area from document data when a document data containing a mixture of character data, photographic data, graphic data, etc., is received by a portable terminal, designate a data display method for each area, and output to display the document data according to the display method. This makes it possible for the receiving side user to recognize the contents of the received document data clearly by means of the display unit of the portable unit.

According to another aspect of the invention, there is provided a data transmission device to be used in a system including a portable terminal having a communication function and the data transmission device capable of communicating with the portable terminal, wherein the system is intended for displaying data transmitted by the data transmission device on the portable terminal, the data transmission device comprising: an area separation means for separating character area where character data exists and non-character area where non-character data exists from document data containing character data and non-character data other than characters for transmission to the portable terminal; a display method designating means for designating a display method for data at the portable terminal in correspondence with each separated area; a designating information adding means for adding designating information concerning the display method to the document data; and a transmitting means for transmitting the document data to the portable terminal.

According to still another aspect of the invention, there is provided a portable terminal to be used in a system including the portable terminal having a communication function and a data transmission device capable of communicating with the portable terminal, wherein the system is intended for displaying data transmitted by the data transmission device on the portable terminal, the portable terminal comprising: a receiving means for receiving document data containing character data and non-character data other than characters from the data transmission device; an area separating means for separating character area where character data exists and non-character area where non-character data exists from the document data; a display method designating means for designating a display method for data in correspondence with each separated area; and a display means for displaying the document data as an output image based on the designated display method.

According to a further aspect of the invention, there is provided a data display method, which uses a portable terminal having a communication function and a data transmission device capable of communicating with the portable terminal and is intended for displaying data transmitted by the data transmission device on the portable terminal, the data display method comprising the steps of: the data transmission device separating character area where character data exists and non-character area where non-character data exists from document data containing character data and non-character data other than characters for transmission to the portable terminal; the data transmission device designating a display method for data at the portable terminal in correspondence with each separated area; the data transmission device adding designating information concerning the display method to the document data; data transmission device transmitting the document data to the portable terminal; the portable terminal receiving the document data from the data transmission device; the portable terminal detecting the designating information from the document data; and the portable terminal displaying the document data as an output image based on the designating information.

According to a still further aspect of the invention, there is provided a data display program for a data transmission device to be used in a system including a portable terminal having a communication function and the data transmission device capable of communicating with the portable terminal, wherein the system is intended for displaying data transmitted by the data transmission device on the portable terminal, the data display program causing the data transmission device to execute a process comprising the steps of: separating character area where character data exists and a non-character area where non-character data exists from document data containing character data and non-character data other than characters for transmission to the portable terminal; designating a display method for data at the portable terminal in correspondence with each separated area; adding designating information concerning the display method to the document data; and transmitting the document data to the portable terminal.

According to a yet further aspect of the invention, there is provided a data display program for a portable terminal to be used in a system including the portable terminal having a communication function and a data transmission device capable of communicating with the portable terminal, wherein the system is intended for displaying data transmitted by the data transmission device on the portable terminal, the data display program causing the portable terminal to execute a process comprising the steps of: receiving document data containing character data and non-character data other than characters from the data transmission device; separating character area where character data exists and non-character area where non-character data exists from the document data; designating a display method for data in correspondence with each separated area, and displaying the document data as an output image based on the designated display method.

The objects, features, and characteristics of this invention other than those set forth above will become apparent from the description given herein below with reference to preferred embodiments illustrated in the accompanying drawings.

BRIEF DESCRIPTION OF THE DRAWINGS

FIG. 17 shows the designating information expressed in text data;

FIG. 18 shows the designating information expressed in ASCII codes;

FIG. 19 shows the designating information expressed in binary data;

FIG. 25 is a diagram for describing a method for obtaining text data from a binary data;

DETAILED DESCRIPTION OF THE PREFERRED EMBODIMENT

The embodiments of this invention will be described below with reference to the accompanying drawings.

Figure 1:
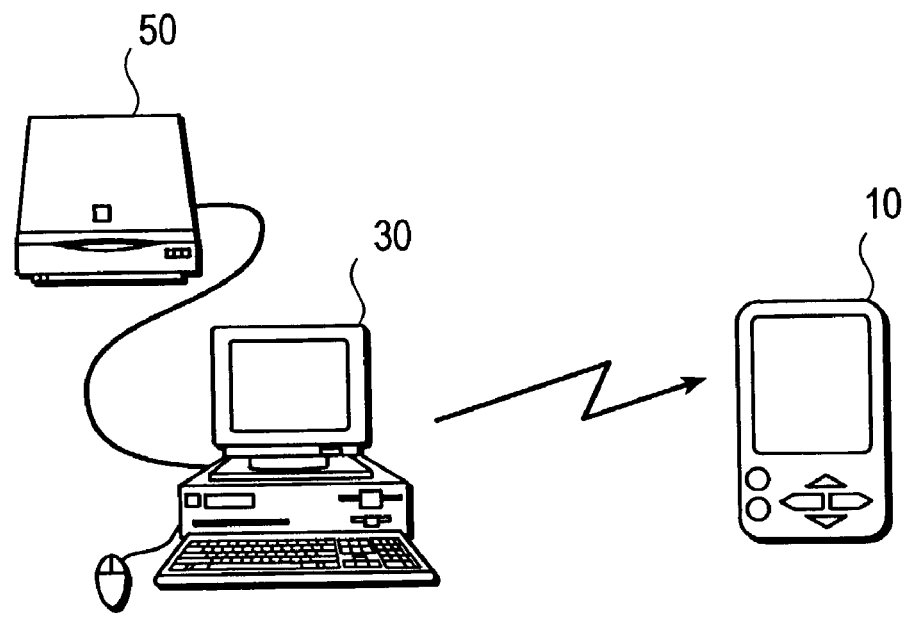
FIG. 1 is a diagram showing the constitution of a data display system according to the first embodiment of the invention.

FIG. 1 is a diagram showing the constitution of a data display system according to the first embodiment of the invention.

The data display system shown in FIG. 1 is equipped with a portable terminal 10 having a communication function, a personal computer 30 (hereinafter called "computer") having a function as a data transmission device capable of communicating with the portable terminal 10, and a scanner 50 connected to the computer 30 by means of a cable, etc.

The personal terminal 10 can be, for example, a PDA. The computer 30 is connected to a data communication network, such as a telephone network, an ISDN, a packet exchange network, etc., and is communicable with the portable terminal 10 via a mobile telecommunication network. However, the communications between the computer 30 and the portable terminal 10 are not limited to communications via the mobile telecommunication network. The communications can be local wireless communications based on standards such as Bluetooth®, IEEE 802.11, HomeRF® and IrDA®.

While the descriptions of the equipment mentioned above will follow, the description on equipment will be made only once when it is first mentioned and the description on similar equipment will not be repeated any further to avoid redundancy.

Figure 2:
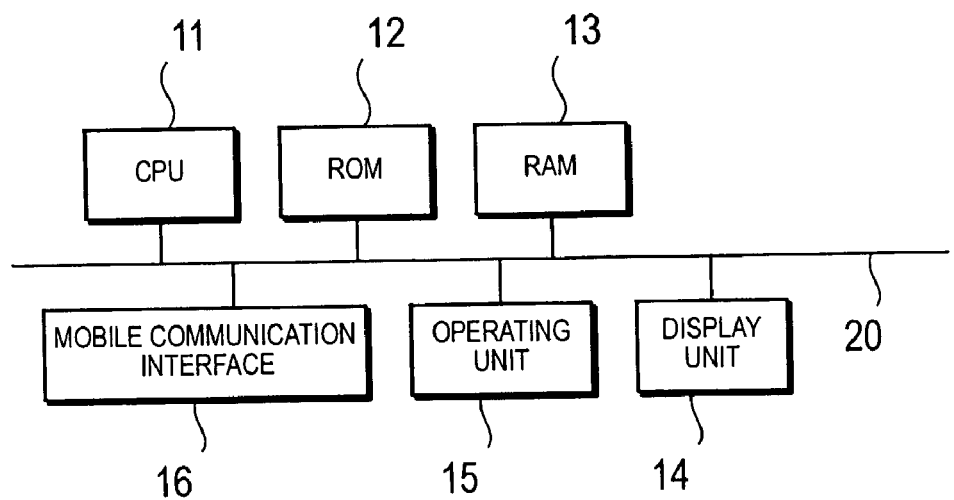
FIG. 2 is a block diagram of an example constitution of a portable terminal.

FIG. 2 is a block diagram of an example constitution of the portable terminal 10.

In FIG. 2, the portable terminal 10 includes a CPU 11, a ROM 12, a RAM 13, a display unit 14, an operating unit 15, a mobile communication interface 16 and a bus 20.

The CPU 11 is in charge of controlling various units mentioned above and performing various arithmetic operations. The ROM 12 stores various programs and data. The RAM 13 stores various data, and is used as a working area for executing various processes. The display unit 14 displays various data. The operating unit 15 is used by the operator for various operations and for issuing instructions. The mobile communication interface 16 is an interface for connecting to the mobile communication network in order to perform mobile communications. Various units mentioned above are interconnected via the bus 20 in order to exchange signals.

Figure 3:
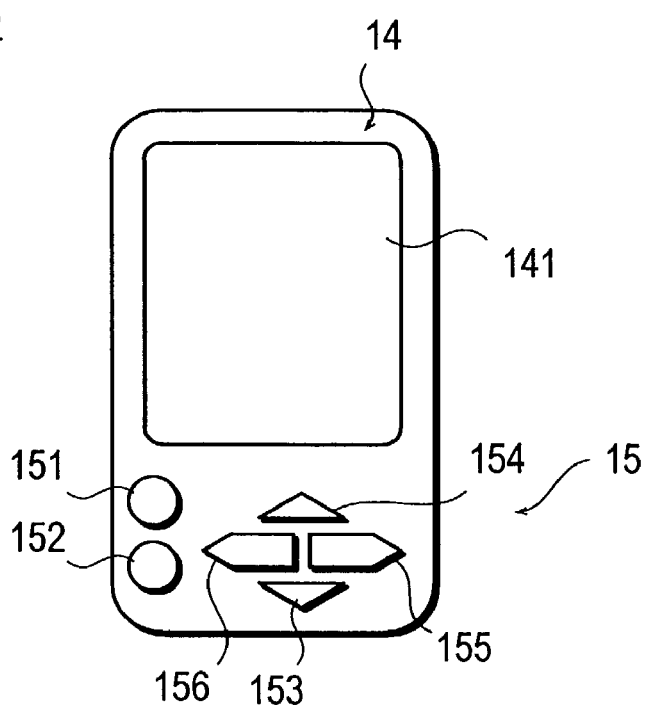
FIG. 3 shows an external view of the portable terminal.

FIG. 3 shows an external view of the portable terminal 10.

An LCD (liquid crystal display) is used as the display unit 14 of the portable terminal 10 in this embodiment. The display 14 is equipped with a screen 141 having 240 dots in the horizontal direction and 340 dots in the vertical direction.

The operating unit 15 includes a character operating key 151, a non-character operating key 152, a page down/downward scroll key 153, a page up/upward scroll key 154, a right scroll key 155, and a left scroll key 156.

The character operating key 151 is used for instructing the scroll operation in the character display area within the screen 141, and the non-character operating key 152 is used for instructing the scroll operation in the non-character display area within the screen 141. The page down/downward scroll key 153 is used for scrolling the image downward by pressing it in conjunction with character operating key 151 or the non-character operating key 152, or for moving forward to the next page incrementally by pressing it independently. The page up/upward scroll key 154 is used for scrolling the image upward by pressing it in conjunction with character operating key 151 or the non-character operating key 152, or for moving backward to the previous page incrementally by pressing it independently. The right scroll key 155 is used for scrolling the image rightward by pressing it in conjunction with character operating key 151 or the non-character operating key 152, or for displaying the data concerning the next non-character area within the same page by pressing it independently. The left scroll key 156 is used for scrolling the image leftward by pressing it in conjunction with character operating key 151 or the non-character operating key 152, or for displaying the data concerning the previous non-character area within the same page by pressing it independently. However, the types and number of keys, and their operating methods in the operating unit 15 described above represent just an example and can be changed arbitrarily.

Figure 4:
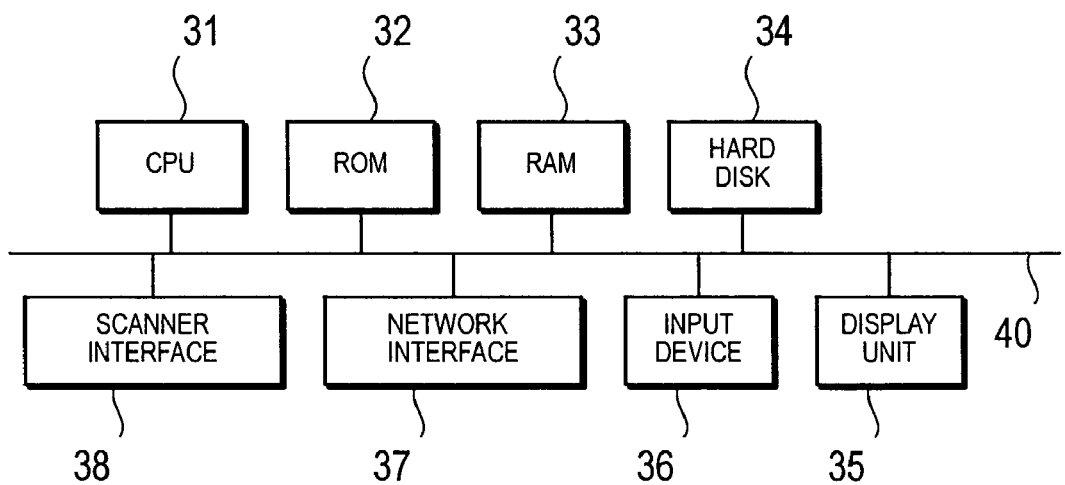
FIG. 4 is a block diagram of an example constitution of a computer.

FIG. 4 is a block diagram of an example constitution of the computer 30.

In FIG. 4, the computer 30 includes a CPU 31, a ROM 32, a RAM 33, a hard disk 34, a display unit 35, an input device 36, a network interface 37, a scanner interface 38, and a bus 40.

The hard disk 34 stores various programs and data. The input device 36 is a device for the user to perform various operations and instructions, and has, e.g., a keyboard and a mouse. The network interface 37 is an interface for connecting the computer 30 to a network for allowing it to communicate with other equipment on the network. The scanner interface 38 is an interface for allowing the computer to communicate with the scanner 50 via a cable, etc.

Figure 5:
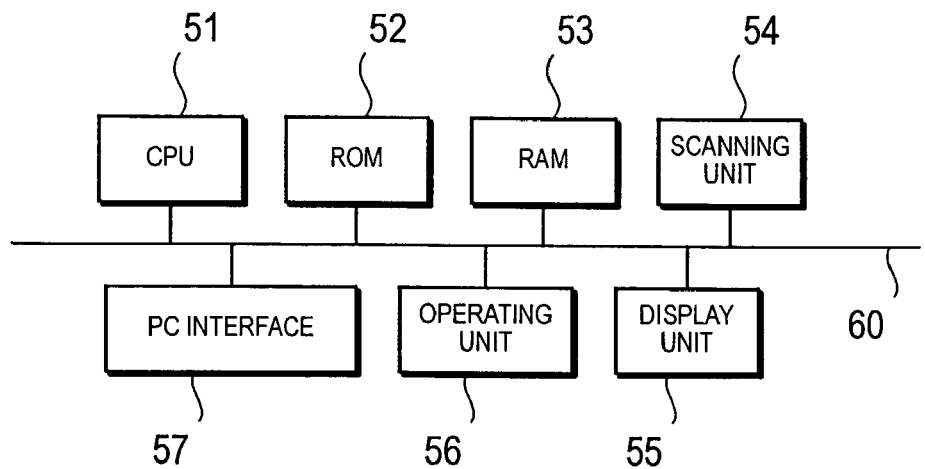
FIG. 5 is a block diagram of an example constitution of a scanner.

FIG. 5 is a block diagram of an example constitution of the scanner 50.

In FIG. 5, the scanner 50 includes a CPU 51, a ROM 52, a RAM 53, a scanning unit 54, a display unit 55, an input device 56, a computer interface (PC interface) 57, and a bus 60.

The scanning unit 54 obtains image data by scanning documents. More specifically, the scanning unit 54 casts light from a fluorescent lamp, etc., on a document placed at a designated scanning position, and generates image data (bitmap data) from electrical signals obtained by photoelectrically converting its reflecting light by means of light receiving devices such as CCD. The PC interface 57 is an interface for communicating with the computer 30 via a cable, etc.

Figure 6:
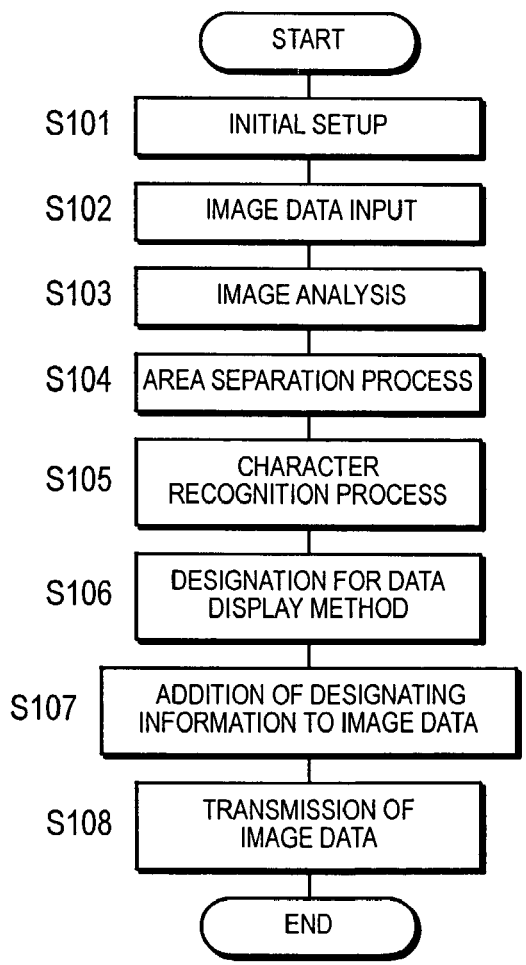
FIG. 6 is a flowchart showing the steps of the data transmission process of the computer.

Next, referring to FIG. 6, the data transmission process on the computer 30 will be described. The algorithm shown in the flow chart of FIG. 6 is stored in the ROM 32 or the hard disk 34 of the computer 30 as the control program and is executed by the CPU 31.

First, in the step S101, various parameters are initialized as an application is started on the computer 30. The scanner 50 is initialized simultaneously.

Figure 7:
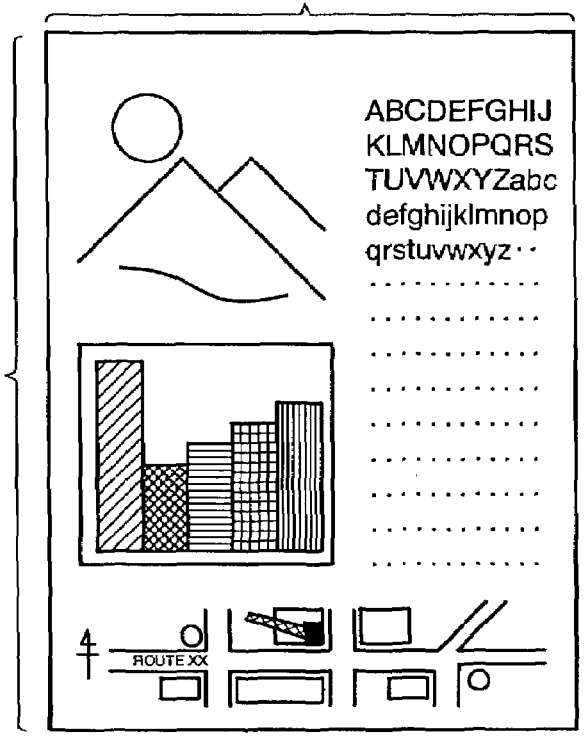
FIG. 7 shows an example image data.

In the step S102, the image data 100 obtained by scanning a document by the scanner 50 connected to the computer 30 is entered. The image data 100 as a document data contains character data and non-character data. Non-character data here means photographic or graphic data. The image data 100 is a bitmap data having pixels consisting of 2500 dots in the horizontal direction and 3500 dots in the vertical direction as shown in FIG. 7. The user can set up scanning conditions such as scanning resolution during the scanning process. It goes without saying that the image data 100 may consist of multiple pages of data although the example shown in FIG. 7 consists of only one page of data.

In the step S103, an image analysis is performed on the image data 100 inputted in the step S102 for recognizing the character area where character data exists and the non-character area where non-character data such as photographic or graphic data exists. This image analysis generally uses a technique of extracting feature values regarding the attributes of an image based on the edge components and the distribution of density levels detected on each minute area of the image data.

In the step S104, a process is performed for recognizing the character area and the non-character area recognized based on the feature values extracted in the step S103, and separating each recognized area as a square area. In the square area generating process, a technique joining minute adjoining areas having similarities with each other to thus integrate them into a square area is used.

Figure 8:
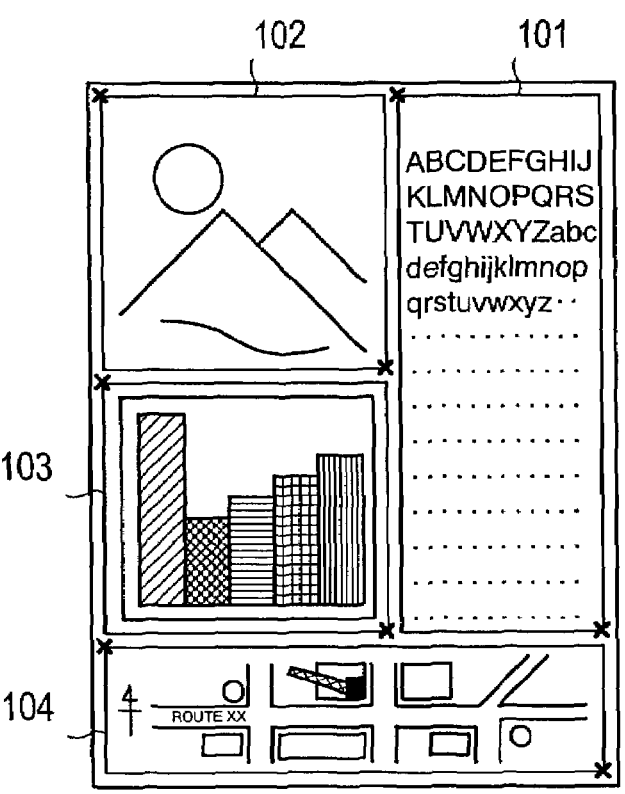
FIG. 8 is a diagram for describing an area separation process.
Figure 9:
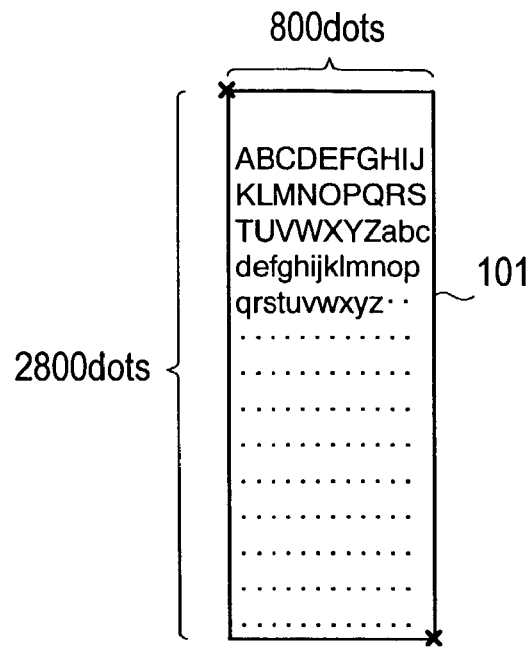
FIG. 9 is a diagram showing a character area.
Figure 10:
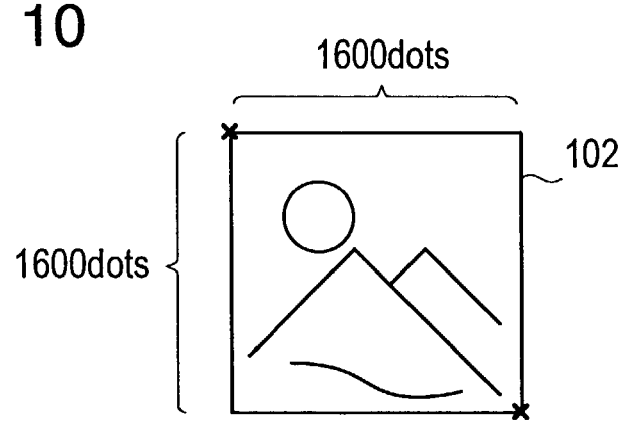
FIGS. 10 through 12 are diagrams showing non-character areas.
Figure 11:
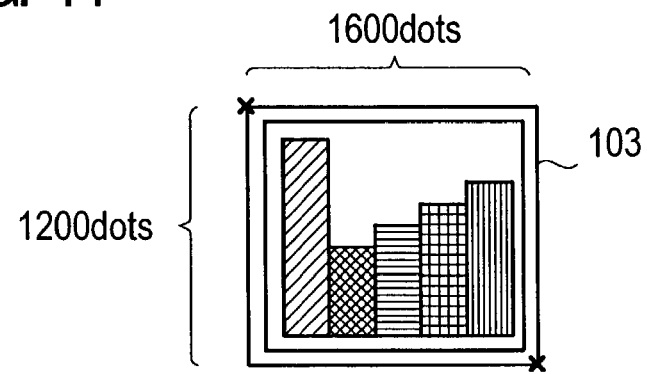
Figure 12:
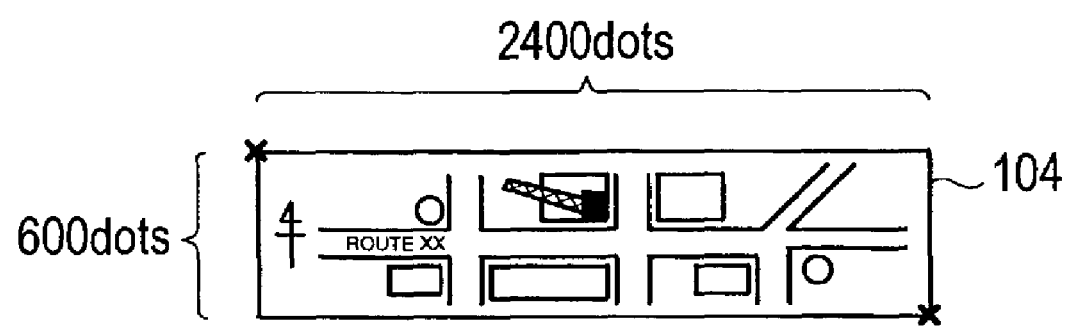

More specifically, a character area 101 and non-character areas 102 through 104 are recognized as shown in FIG. 8 from the image data 100 shown in FIG. 7. The areas 101 through 104 are separated into square areas shown in FIG. 9 through FIG. 12. For each of these separated areas, the positional information represented by the coordinates of the top left corner and the bottom right corner of the diagram in the particular area, and the numbers of pixels in the horizontal direction and the vertical direction of the data in the particular area are stored in the RAM 33 together with the image data. For example, the character area 101 has 800 dots of pixels in the horizontal direction and 2800 dots of pixels in the vertical direction, the non-character area 102 has 1600 dots of pixels in the horizontal direction and 1600 dots of pixels in the vertical direction, the non-character area 103 has 1600 dots of pixels in the horizontal direction and 1200 dots of pixels in the vertical direction, and the non-character area 104 has 2400 dots of pixels in the horizontal direction and 600 dots of pixels in the vertical direction.

In the step S105, the character recognition process is executed for the character area 101 separated in the step S104. Specifically, a particular character is recognized from a character data as an image, i.e., a character image, in the character area 101. The method of identifying a particular character from a character image is performed, for example, based on the degree of matching between the feature values of each character image and the dictionary patterns stored in the ROM 32.

In the step S106, a data display method is designated for displaying data within each area to the display screen of the portable terminal. The data display method designations include the designation of the data display-scaling ratio, or the designation of the scroll display mode on the display unit screen of the portable terminal. The data display-scaling ratio here includes a case of designating the allowable display-scaling ratio by designating a range. The scroll display mode designation includes a case of designating a data within a particular area as a character data, thus effectively specifying the particular data to be displayed in a scroll display mode.

Figure 13:
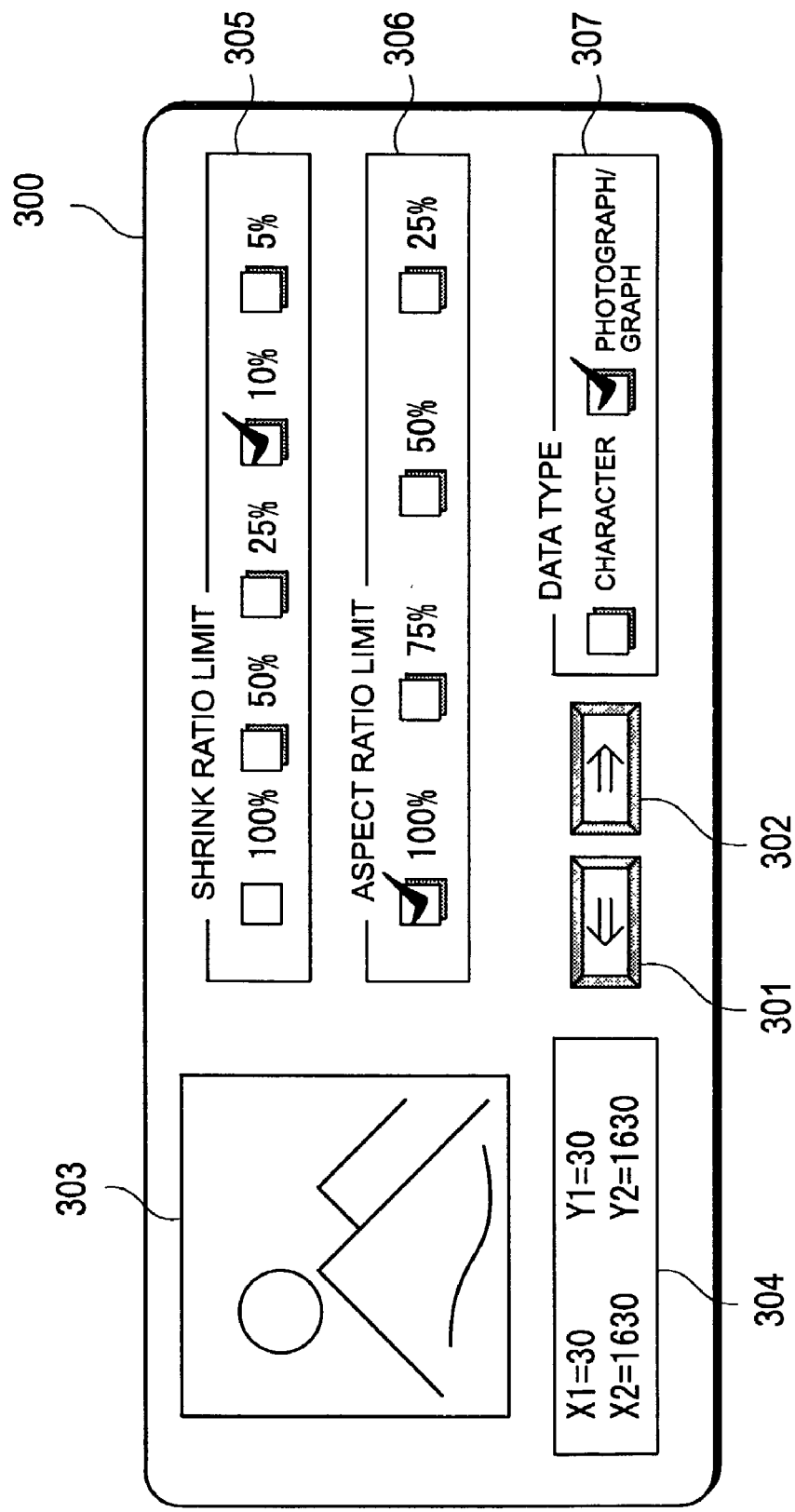
FIGS. 13 through 16 show a display method for designating dialog boxes.
Figure 14:
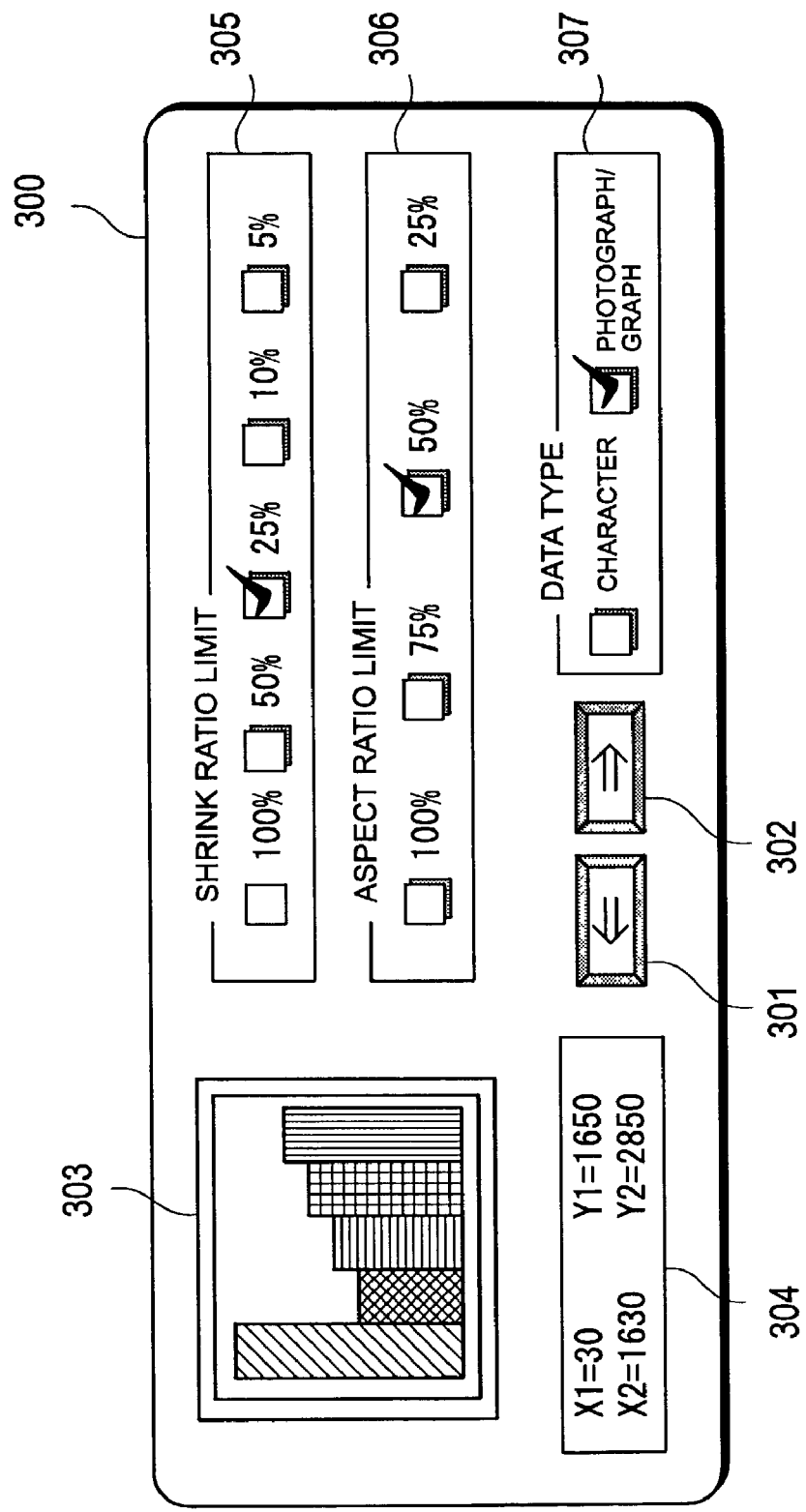
Figure 15:
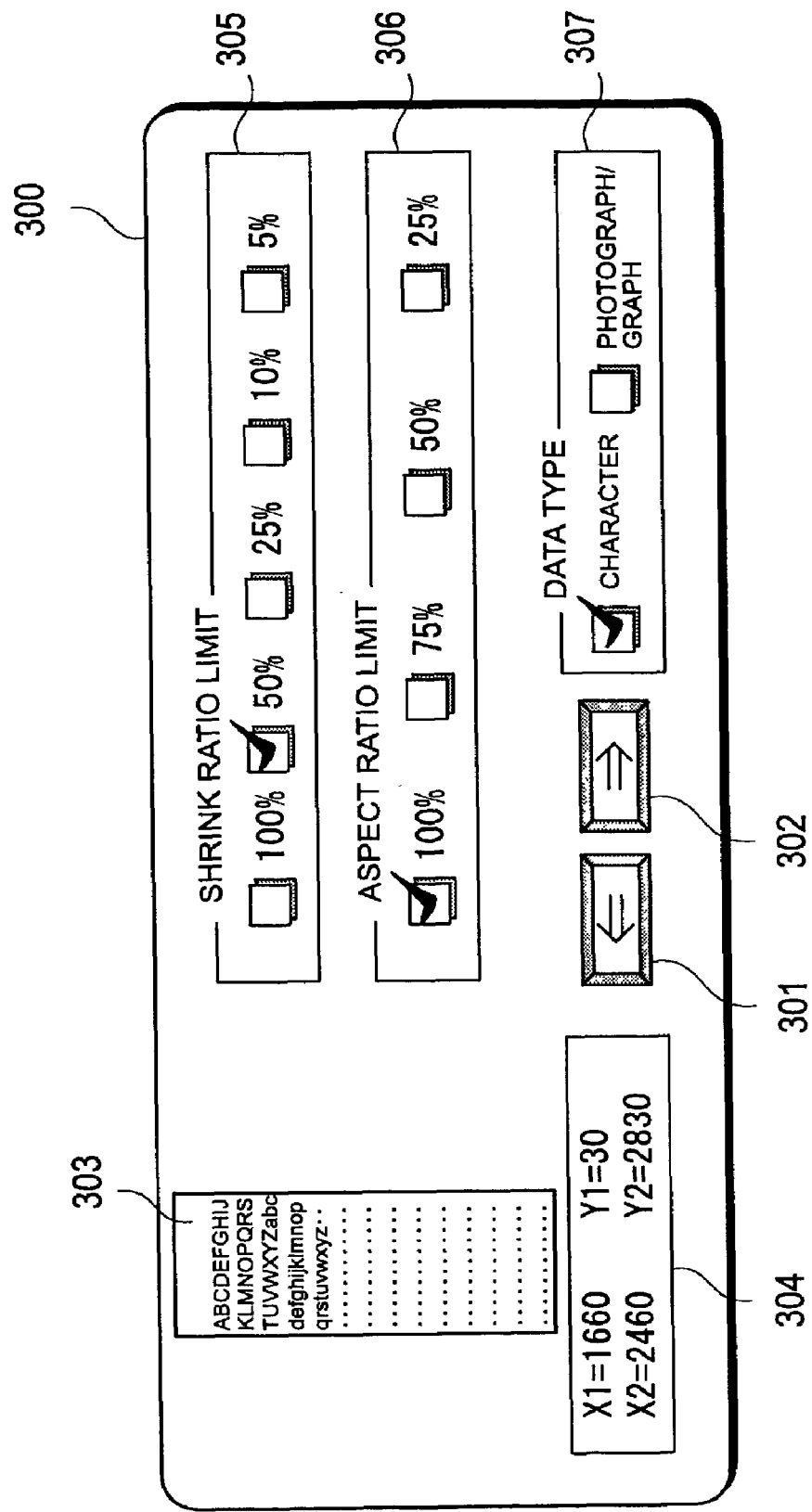
Figure 16:
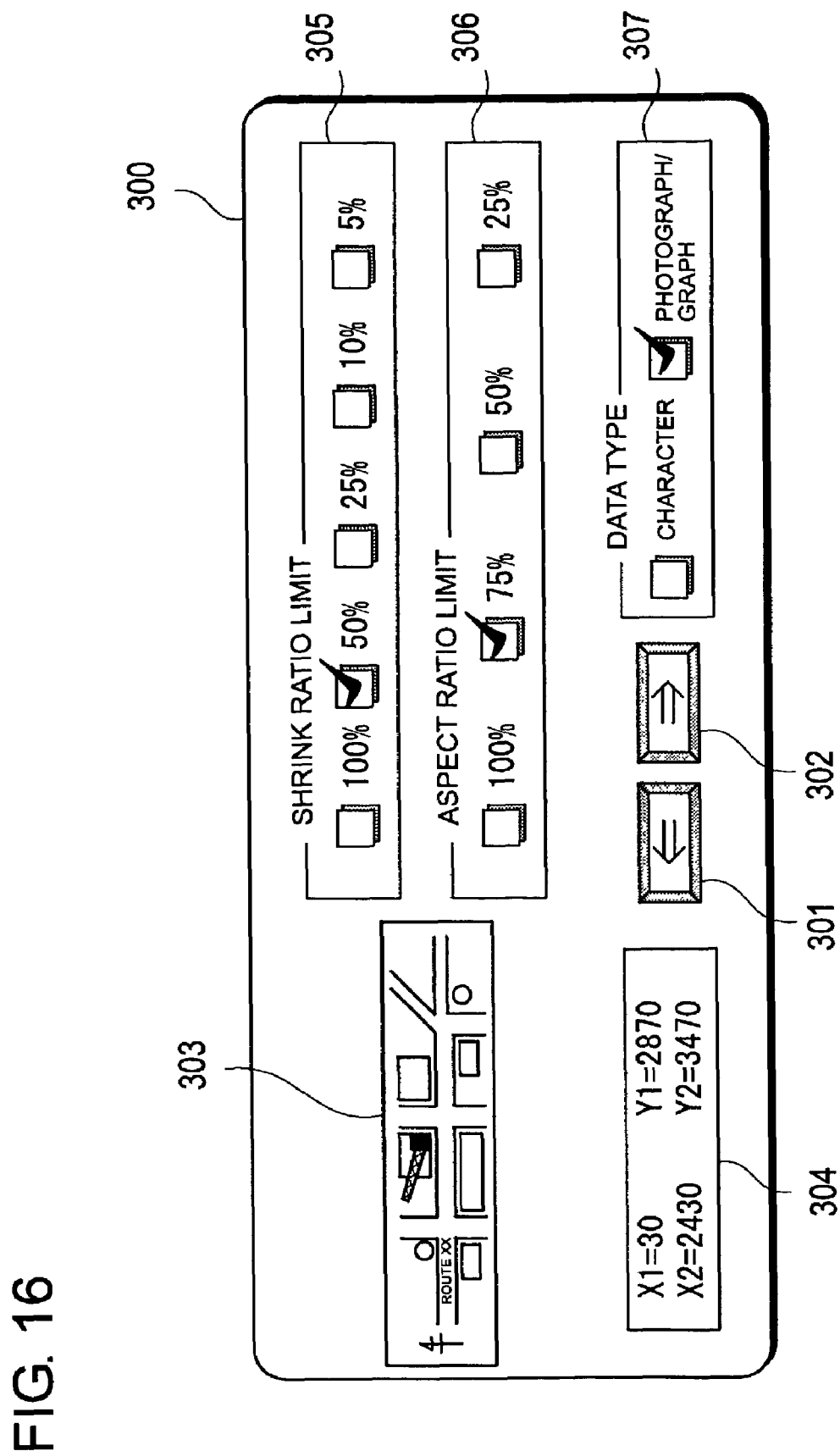

The designation of the data display method is executed according to the input by the transmitting side user. As shown in FIG. 13, a dialog box 300 displayed on the display unit 35 of the computer 30 is used in this case. Specifically, a data, for which the display method is to be designated, is selected first by the operation of display data selection buttons 301 and 302. The selected data is displayed on the data display part 303, and the positional information of the area having the selected data is displayed on a coordinate display part 304. The pushbutton 302 is used to select the data in the next area of multiple areas and the pushbutton 301 is used to select the data in the previous area.

A shrink ratio limit-setting part 305 is used to set a shrink ratio limit, which is judged to be the recognition limit for the selected data. It means that the smaller the value of the shrink ratio limit, the greater the degree of freedom in shrinking the data. An aspect ratio limit-setting part 306 is used to set an aspect ratio limit, which is judged to be the recognition limit for the selected data. It means that the smaller the value of the aspect ratio limit, the greater the degree of freedom in modifying the aspect ratio of the data. Moreover, a data type setup part 307 is used for setting the data type for a selected data, i.e., either the character data type or the non-character data type. While the data type is automatically set based on the recognition by the image analysis executed in the step S103, the user can correct the data type, if necessary, by means of the data type setup part 307. The processes described above are repeated on the data in each area as shown in FIG. 13 through FIG. 16.

In the step S107, the information concerning the data display method designated in the step S106, i.e., the designating information, is added to the image data 100 stored in the RAM 33 in the step S104.

FIG. 17 shows the designating information expressed in text data. In FIG. 17, "BEGIN" in the text data 401 indicates the beginning of the designation. For each area, the description begins with "Display" and describes x and y coordinates of the left top corner, the x and y of the bottom right corner, the shrink ratio limit, the aspect ratio limit, and the data type, each entry separated by a comma. "END" indicates the end of a designation process. A data consisting of character strings recognized by the character recognition process is added to the portion that corresponds to a character square area 101. The designating information expressed by text data 401 shown in FIG. 17 is expressed in a hexadecimal data 402 (ASCII code) (FIG. 18), and further expressed in a binary data 403 (FIG. 19).

Figure 20:
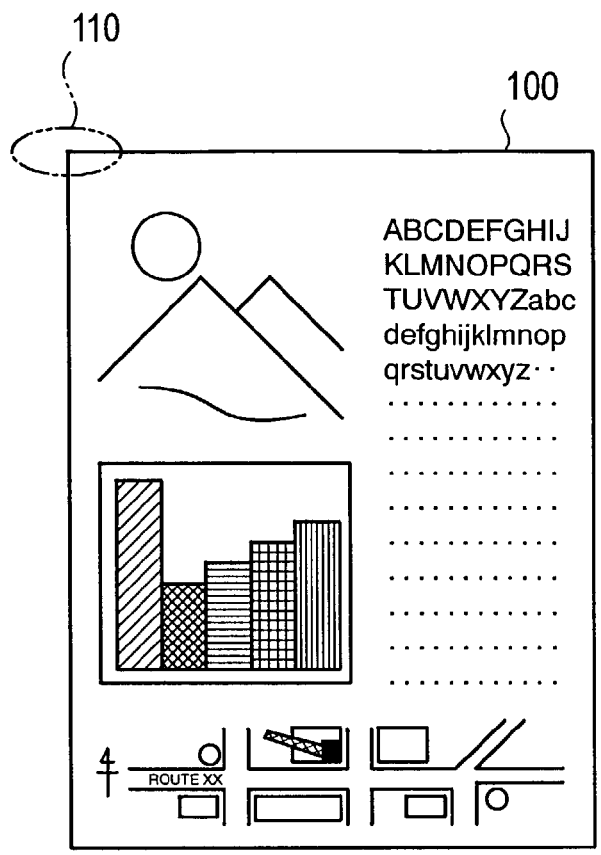
FIG. 20 is a diagram for describing the addition of the designating information to the image data.
Figure 21:
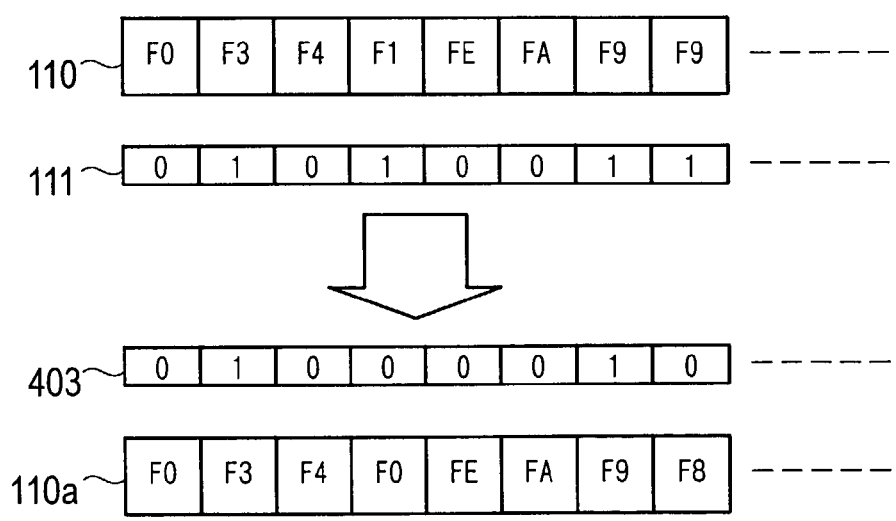
FIG. 21 is a diagram for describing the addition of the designating information using electronic watermarking.
Figure 22:
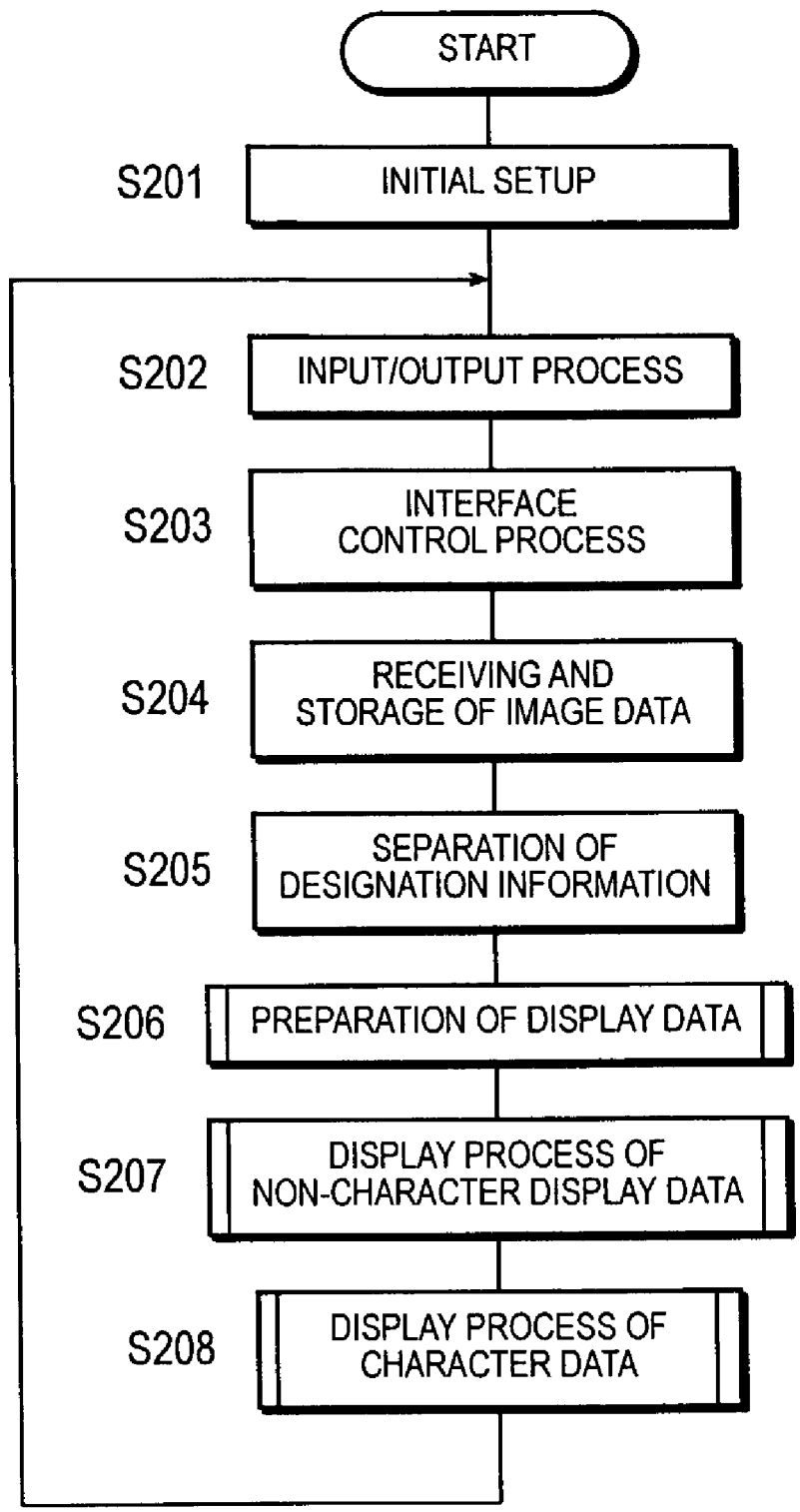
FIG. 22 is a flowchart showing the steps of the data receiving process of the portable terminal.

Further, the designating information converted into the binary data 403 is added to the leading data 110 containing a specified pixel from the first pixel in the image data 100 as shown in FIG. 20. Specifically, the least significant bit train 111 of the leading data 110, which is a multi-value data, is replaced with the binary data 403 to form a leading data 110a, as shown in FIG. 21. As a result, an image data added with the designating information is formed. The least significant bits of the particular data are generally unrecognizable with naked eyes when image data is outputted and its effect on the picture quality when they are replaced with other bits is insignificant in comparison with the output result of the original image data. The technique of adding designating information used in this embodiment is, as can be seen from the above description, the so-called "electronic watermark" technology that embeds information in such a way that it is difficult to be visually recognized when outputted as an image. Consequently, the designation can be efficiently transmitted without deteriorating the image data. However, there are several electronic watermarking methods so that the invention is not limited by the above method.

In the step S108, the image data added with the designating information is transmitted to the portable terminal 10 according to the user's instruction.

The steps of the data receiving process on the portable terminal 10 will be described next referring to FIG. 22 and FIG. 26 through FIG. 31. The algorithm indicated by the flowcharts of FIG. 22 and FIG. 26 through FIG. 31 is stored in the ROM 12 of the portable terminal 10 and is executed by the CPU 11.

First, in the step S201, the initialization including the setup of the initial screen display is executed as the power for the portable terminal 10 is turned on. In the step S202, various input/output process such as the detection of the key input is made through the operating unit 15. When a proper termination instruction is issued in this process, the execution of the control program will be terminated. In the step S203, the interface control process such as data reception from external equipment will be executed.

In the step S204, the image data transmitted from other equipment such as the computer 30 is received and the received image data is stored in the RAM 13.

Figure 23:
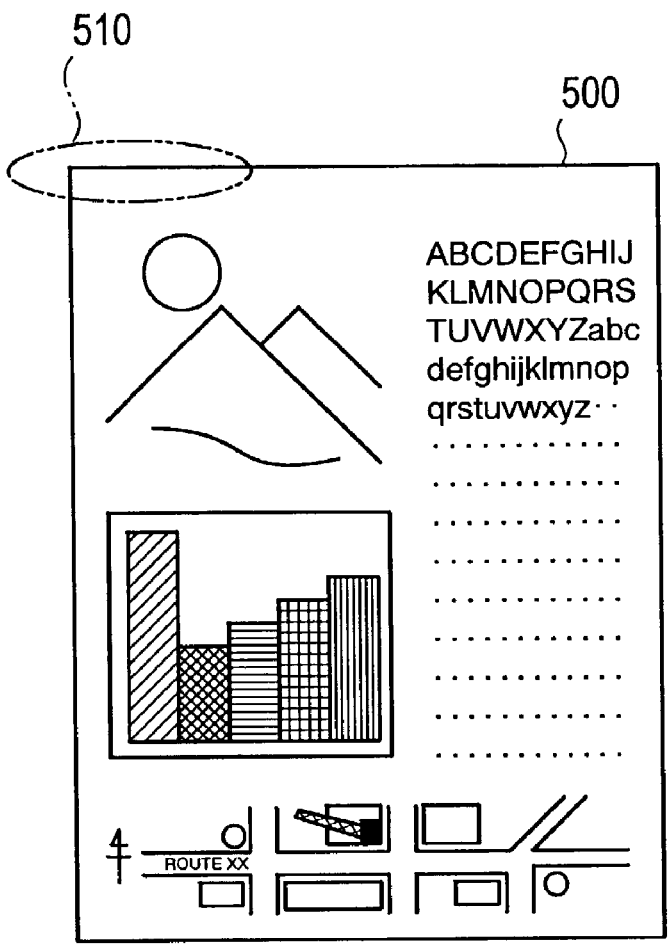
FIG. 23 is a diagram for describing a method of detecting leading data from the received image data.
Figure 24:
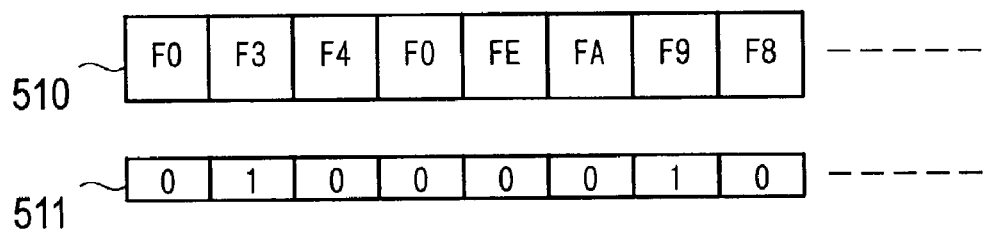
FIG. 24 is a diagram for describing the method of extracting binary data, which is the least significant bit train from the leading data.

In the step S205, the designating information concerning the data display method is detected from the received image data. Specifically, first, the leading data 510 of the received image data is detected as shown in FIG. 23. The leading data 510 contains the first pixel and specified pixels in continuation of the first pixel in the received image data. Next, the least significant bit train 511 of the leading data 510, which is the multi-value data, is extracted as a binary data as shown in FIG. 24. The binary data 511, which is the least significant bit train, is converted into a hexadecimal data 501 (ASCII code) as shown in FIG. 25. Consequently, a text data 502 consisting of a specified character string is obtained.

In the step S206, display data is prepared based on the received image data for displaying on the screen of the display unit 14 of the portable terminal 10. The detail procedures for preparing this display data will be described later. The display data includes non-character display data and character data.

In the step S207, a process is executed for displaying non-character display data on the screen of the display unit 14 of the portable terminal 10. The detail procedures for displaying the non-character display data will be described later.

In the step S208, a process is executed for displaying character data on the screen of the display unit 14 of the portable terminal 10. The detail procedures for displaying the character data will be described later. When the step S208 is finished, the process returns to the step S202.

It goes without saying that the portable terminal 10 of the present embodiment will be used for various purposes other than the process of displaying the received image data.

Next, the procedures for preparing display data in the step S206 will be described referring to FIG. 26 through FIG. 28.

In the step S301, the designating information concerning the method of displaying the data detected from the image data 500 in the step S205 is retrieved onto the working area of the RAM 13.

In the step S302, a judgment is made as to whether any character areas are contained in the image data 500. If a character area is contained (S302: Yes), the process of the step S303 is executed; if no character area is contained (S302: No), the process of the step S305 is executed.

In the step S303, the data concerning the character area is stored into the RAM 13 as a text data file. This text data can be obtained from the designating information. The text data is in effect stored as a character code data expressed in a specified character code such as ASCII code.

In the step S304, the number of characters contained in the text file prepared in the step S303 is counted. The count value is substituted into a parameter $N_t$ that indicates the number of characters.

In the step S305, the number of non-character areas contained in the image data 500 is counted. The count value is substituted into a parameter $N_p$ that indicates the number of non-character areas.

In the step S306, a judgment is made as to whether the number $N_p$ of non-character areas is not less than 1. If the number $N_p$ is not less than 1 (S306: Yes), the process of the step S307 is executed; if the number $N_p$ is less than 1 (S306: No), it is judged that there is no non-character area and the processes of the step S207 shown in FIG. 22 and thereafter are executed.

In the step S307, a parameter "i" that indicates the order number of the non-character area currently being processed is initialized to 1.

In the step S308, the process of preparing the non-character display data for the i-th non-character area is executed. The detail procedures for preparing the non-character display data for the i-th non-character area will be described later.

In the step S309, the parameter "i" is incremented by one.

In the step S310, a judgment is made as to whether the parameter "i" is greater than the number $N_p$ of non-character areas, i.e., whether the process of preparing the non-character display data has been completed to the last non-character area. If the process is completed to the last non-character area (S310: Yes), the process advances to the step S207 of FIG. 22; if the process is not yet completed to the last non-character area (S310: No), the steps S308 through S310 will be repeated.

Next, the procedures for preparing non-character display data for the i-th non-character area in the step S308 will be described below referring to FIG. 27 and FIG. 28.

In the step S401, the non-character data for the i-th non-character area stored in the RAM 13 is retrieved onto the working area of the RAM 13.

In the step S402, the number of the horizontal direction pixels is substituted into the parameter $X_d$ and the number of the vertical direction pixels is substituted into the parameter $Y_d$ concerning the non-character data for the i-th non-character area based on the designating information.

In the step S403, the horizontal direction shrink ratio $X_{tz}$ for causing the horizontal direction pixel count $X_d$ of the non-character data to match with the horizontal direction pixel count $D_h$ of the non-character data display area on the screen of the display unit 14 is calculated from the formula, $X_{tz}=D_h/X_d$. Similarly, the vertical direction shrink ratio $Y_{tz}$ for causing the vertical direction pixel count $Y_d$ of the non-character data to match with the vertical direction pixel count $D_v$ of the non-character data display area on the screen of the display unit 14 is calculated from the formula, $Y_{tz}=D_v/Y_d$.

In the step S404, a judgment is made as to whether the horizontal direction shrink ratio $X_{tz}$ is not less than the shrink ratio limit $L_r$ indicated in the designating information. If $X_{tz} \geq L_r$ holds (S404: Yes), the process of the step S405 is executed; if $X_{tz} \geq L_r$ does not hold (S404: No), the process of the step S413 is executed.

In the step S405, the vertical direction display pixel count $Y_{td}$ is calculated from the formula $Y_{td}=Y_d*X_{tz}$ based on the horizontal direction shrink rate $X_{tz}$.

In the step S406, a judgment is made as to whether the vertical direction display pixel count $Y_{td}$ is not more than the vertical direction pixel count $D_v$ of the non-character data display area on the screen of the display unit 14. If $Y_{td} \leq D_v$ holds (S406: Yes), the process of the step S407 is executed; if $Y_{td} \leq D_v$ does not hold (S406: No), the process of the step S410 is executed.

In the step S407, a judgment is made as to whether the value obtained by dividing the vertical direction display pixel count $Y_{td}$ by the aspect ratio limit $L_{xy}$ indicated in the designating information is not less than the vertical direction pixel count $D_v$ in the non-character data display area on the screen of the display unit 14. If $Y_{td}/L_{xy} \geq D_v$ holds (S407: Yes), the process of the step S408 is executed; if $Y_{td}/L_{xy} \geq D_v$ does not hold (S407: No), the process of the step S409 is executed.

In the step S408, the horizontal scaling ratio $X_z$ is set to $X_{tz}$. Further, the vertical scaling ratio $Y_z$ is set to $D_v/Y_d$. In other words, the non-character display data is displayed on the entire area of the non-character data display area (size: $D_v * D_h$) on the screen of the display unit 14.

In the step S409, the horizontal scaling ratio $X_z$ is set to $X_{tz}$. Further, the vertical scaling ratio $Y_z$ is set to $X_{tz}/L_{xy}$. In other words, the non-character display data will be displayed in such a way that a margin having no output image is created on the lower area of the non-character data display area (size: $D_v * D_h$).

In the step S410, a judgment is made as to whether the value obtained by multiplying the vertical direction display pixel count $Y_{td}$ by the aspect ratio limit $L_{xy}$ indicated in the designating information is not more than the vertical direction pixel count $D_v$ in the non-character data display area on the screen of the display unit 14. If $Y_{td}*L_{xy} \leq D_v$ holds (S410: Yes), the process of the step S411 is executed; if $Y_{td}*L_{xy} \leq D_v$ does not hold (S410: No), the process of the step S412 is executed.

In the step S411, the horizontal scaling ratio $X_z$ is set to $X_{tz}$. Further, the vertical scaling ratio $Y_z$ is set to $D_v/Y_d$. In other words, the non-character display data is displayed on the entire area of the non-character data display area (size: $D_v * D_h$) on the screen of the display unit 14.

In step S412, the horizontal scaling ratio $X_z$ is set to $X_{tz}$. Further, the vertical scaling ratio $Y_z$ is set to $X_{tz}$. In this case if the image overflows in the vertical direction out of the non-character data display area (size: $D_v * D_h$), it is necessary to display the image in the vertical scrolling manner.

In the step S413, the $Y_{tz}$ process, which is the scaling ratio calculation process based on the vertical shrink ratio, is executed. The detail of this $Y_{tz}$ process will be described later.

In the step S414, the scaling process is executed on the non-character data for the i-th non-character area, and the scaled non-character display data is stored as a file.

Next, referring to FIG. 28, the $Y_{tz}$ process in the step 413 will be described.

In the step S501, a judgment is made as to whether the vertical direction shrink ratio $Y_{tz}$ is not less than the shrink ratio limit $L_r$ indicated in the designating information. If $Y_{tz} \geq L_r$ holds (S501: Yes), the process of the step S502 is executed; if $Y_t \geq L_r$ does not hold (S501: No), the process of the step S510 is executed.

In the step S502, the horizontal direction pixel count $X_{td}$ is calculated from the formula $X_{td}=X_d*Y_{tz}$ based on the vertical direction shrink rate $Y_{tz}$.

In the step S503, a judgment is made as to whether the horizontal direction display pixel count $X_{td}$ is not more than the horizontal direction pixel count $D_h$ of the non-character data display area on the screen of the display unit 14. If $X_{td} \leq D_h$ holds (S503: Yes), the process of the step S504 is executed; if $X_{td} \leq D_h$ does not hold (S503: No), the process of the step S507 is executed.

In the step S504, a judgment is made as to whether the value obtained by dividing the horizontal direction display pixel count $X_{td}$ by the aspect ratio limit $L_{xy}$ indicated in the designating information is not less than the horizontal direction pixel count $D_h$ in the non-character data display area on the screen of the display unit 14. If $X_{td}/L_{xy} \geq D_h$ holds (S504: Yes), the process of the step S505 is executed; if $X_{td}/L_{xy} \geq D_h$ does not hold (S504: No), the process of the step S506 is executed.

In the step S505, the horizontal scaling ratio $Y_z$ is set to $Y_{tz}$. Further, the horizontal scaling ratio $X_z$ is set to $D_h/X_d$. In other words, the non-character display data is displayed on the entire area of the non-character data display area (size: $D_v * D_h$) on the screen of the display unit 14.

In the step S506, the vertical scaling ratio $Y_z$ is set to $Y_{tz}$. Further, the horizontal scaling ratio $X_z$ is set to $Y_{tz}/L_{xy}$. In other words, the non-character display data will be displayed in such a way that a margin having no output image is created on the right side of the non-character data display area (size: $D_v * D_h$).

In the step S507, a judgment is made as to whether the value obtained by multiplying the horizontal direction display pixel count $X_{td}$ by the aspect ratio limit $L_{xy}$ indicated in the designating information is not more than the horizontal direction pixel count $D_h$ in the non-character data display area on the screen of the display unit 14. If $X_{td}*L_{xy} \leq D_h$ holds (S507: Yes), the process of the step S508 is executed; if $X_{td}*L_{xy} \leq D_h$ does not hold (S507: No), the process of the step S509 is executed.

In the step S508, the vertical scaling ratio $Y_z$ is set to $Y_{tz}$. Further, the horizontal scaling ratio $X_z$ is set to $D_h/X_d$. In other words, the non-character display data is displayed on the entire area of the non-character data display area (size: $D_v * D_h$) on the screen of the display unit 14.

In the step S509, the vertical scaling ratio $Y_z$ is set to $Y_{tz}$. Further, the horizontal scaling ratio $X_z$ is set to $Y_{tz}$. In this case, the image overflows in the horizontal direction out of the non-character data display area (size: $D_v * D_h$), it is necessary to display in the horizontal scrolling manner.

In the step S510, the vertical scaling ratio $Y_z$ is set to $L_r$. Further, the horizontal scaling ratio $X_z$ is set to $L_r$. In this case, the image overflows in the horizontal and vertical direction out of the non-character data display area (size: $D_v * D_h$), it is necessary to display in the horizontal and vertical scrolling manner.

Figure 26:
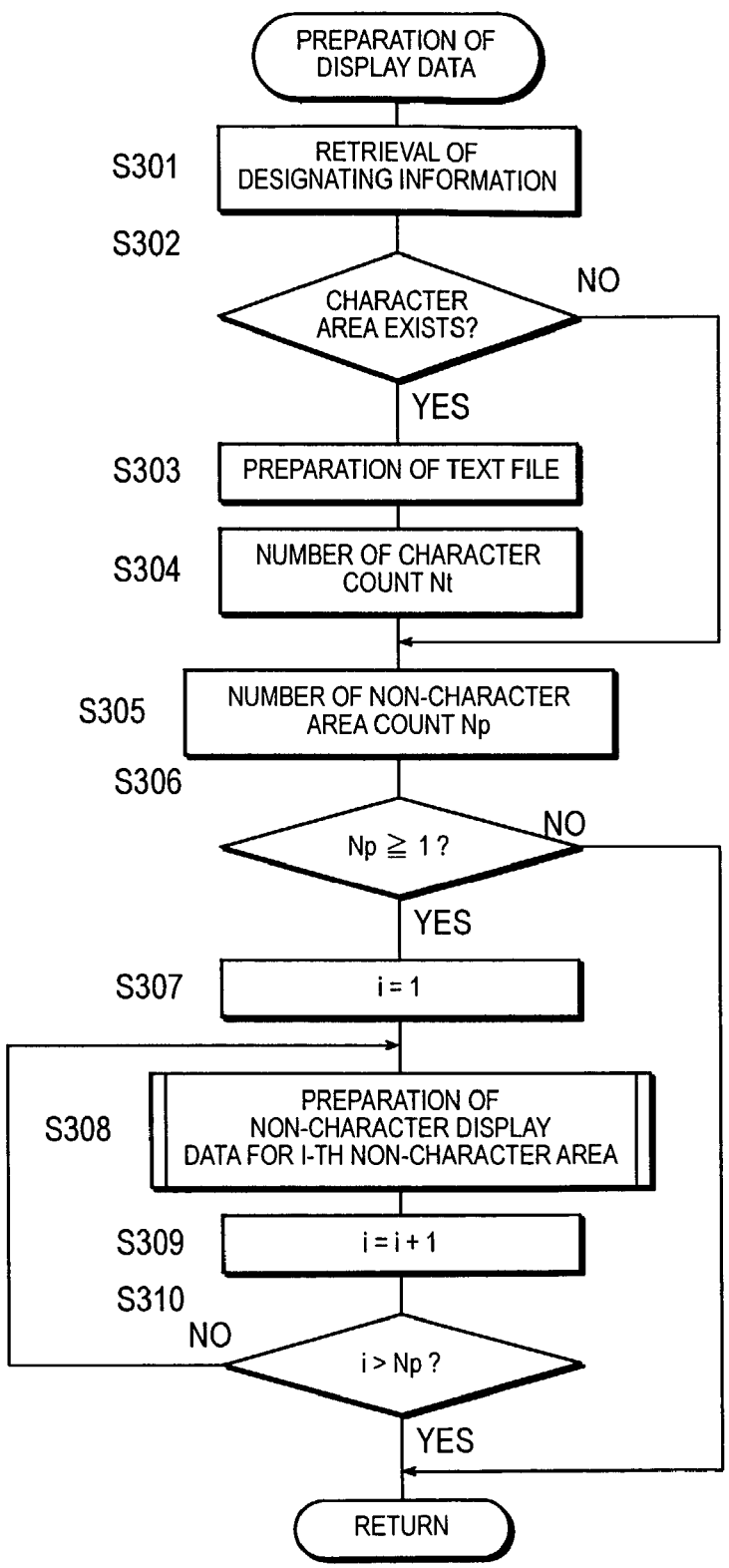
FIG. 26 is a flowchart showing the process of preparing display data.
Figure 27:
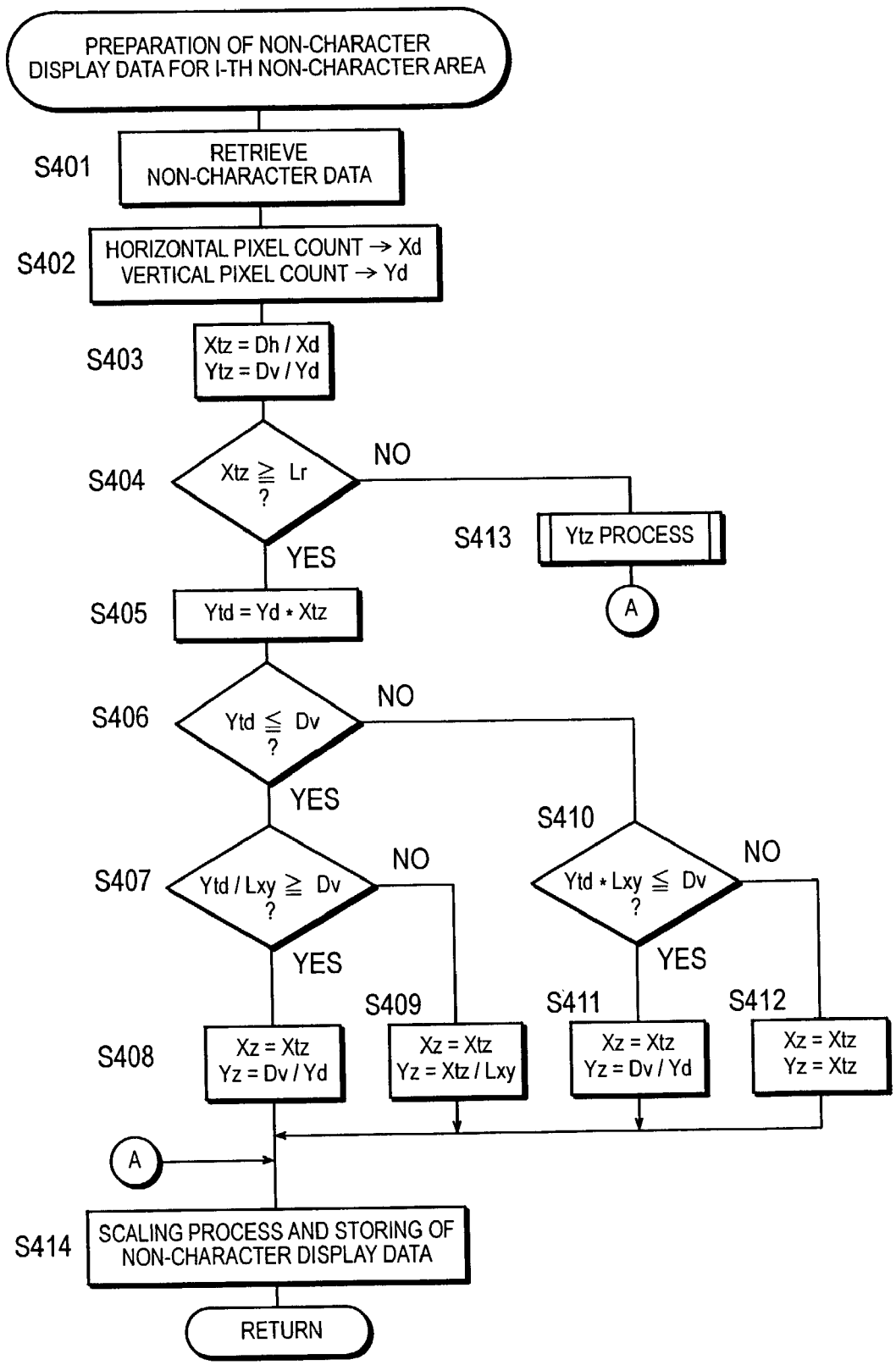
FIG. 27 is a flowchart showing the process of preparing non-character display data for the i-th non-character area.
Figure 28:
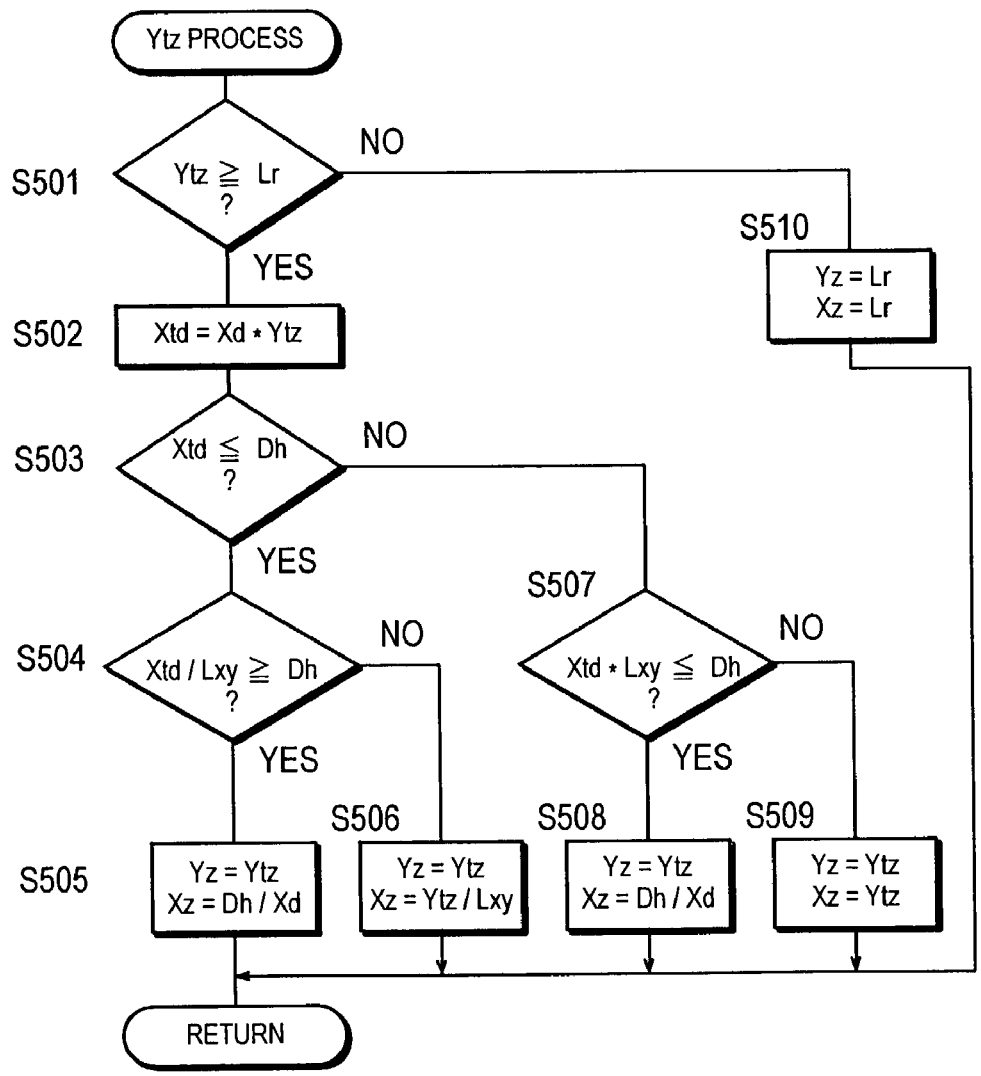
FIG. 28 is a flowchart showing the steps of a $Y_{tz}$ process.

With the above processes shown in FIG. 26 through FIG. 28, the preparation of the display data is finished.

Figure 29:
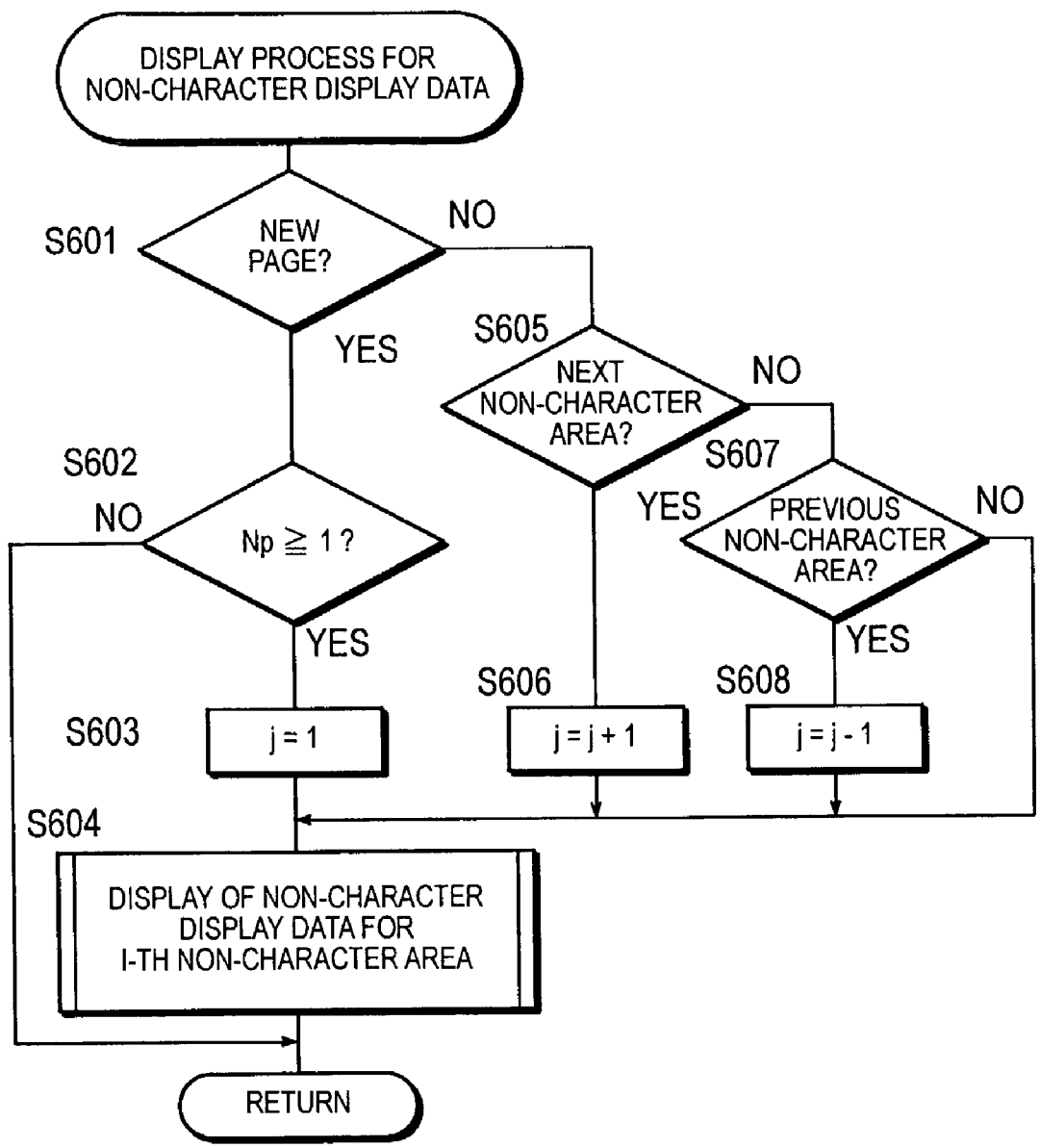
FIG. 29 is a flow chart showing the process of displaying non-character display data.
Figure 30:
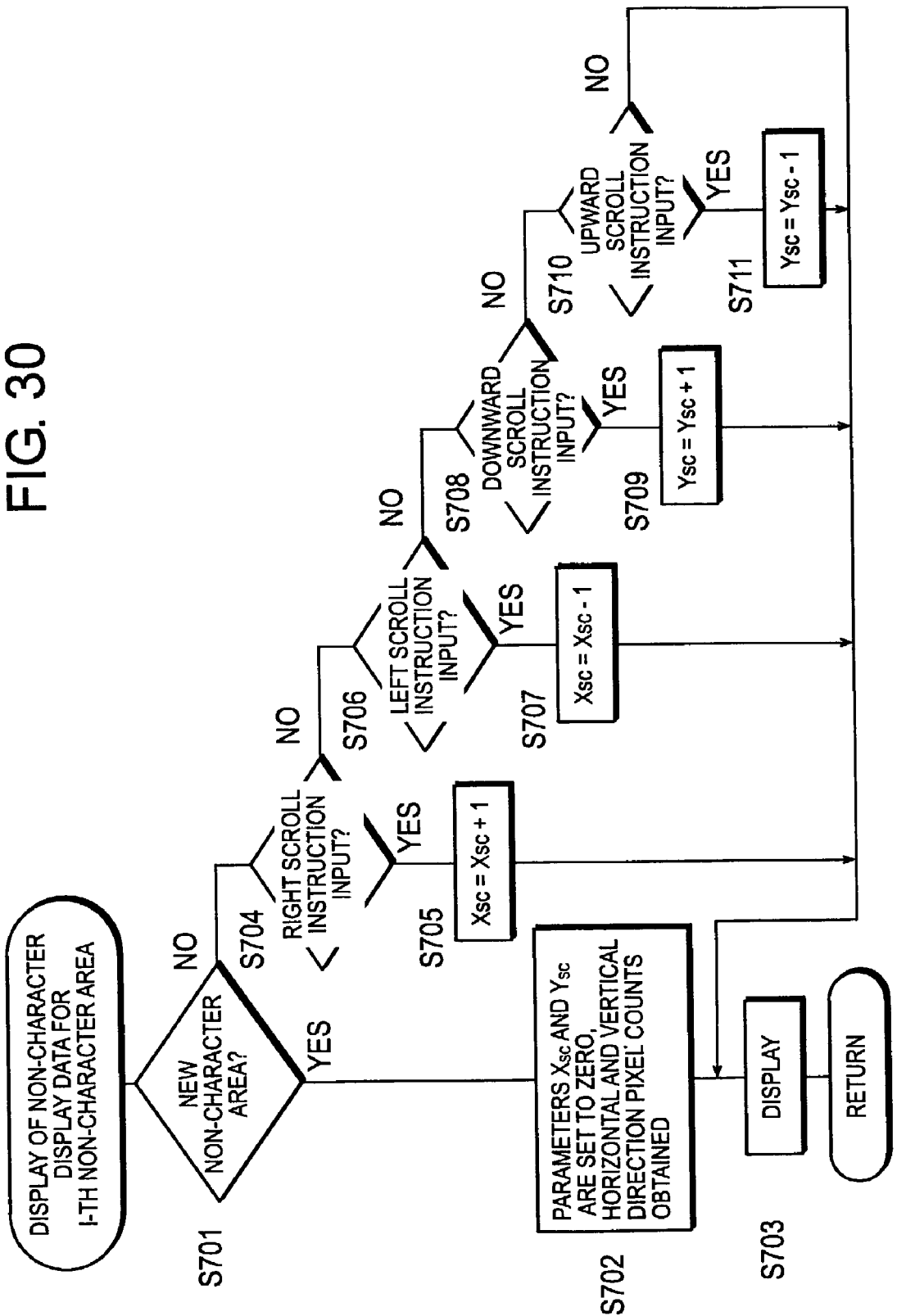
FIG. 30 is a flowchart showing the process of displaying non-character display data for the j-th non-character area.

Next, the procedures for displaying non-character display data in the step S207 will be described below referring to FIG. 29 and FIG. 30.

In the step S601, a judgment is made as to whether a new page is selected through the operating unit 15. If a new page is selected (S601: Yes), the process of the step S602 is executed; if no new page is selected (S601: No), the process of the step S605 is executed.

In the step S602, a judgment is made as to whether the number $N_p$ of non-character areas is not less than 1. If $N_p \geq 1$ holds (S602: Yes), the process of the step S603 is executed; if $N_p \geq 1$ does not hold (S602: No), it advances to the process of the step S208 shown in FIG. 22.

In the step S603, the parameter "j" that indicates the order number of the non-character area currently being displayed is initialized to 1.

In the step S604, the process of displaying non-character display data for the j-th non-character area is executed. The procedures for displaying the non-character display data concerning the j-th non-character area will be described later.

In the step S605, a judgment is made as to whether any instruction input for displaying the data for the next non-character area is made through the operating unit 15. If there is such an instruction input (S605: Yes), the process of the step S606 is executed; if there is no such instruction input (S605: No), the process of the step S607 is executed.

In the step S606, the parameter "j" is incremented by one. However, the parameter "j" is not incremented, if it becomes larger than the number $N_p$ of the non-character areas.

In the step S607, a judgment is made as to whether any instruction input for displaying the data for the previous non-character area is made through the operating unit 15. If there is such an instruction input (S607: Yes), the process of the step S608 is executed; if there is no such instruction input (S607: No), the process of the step S604 is executed.

In the step S608, the parameter "j" is decremented by one. However, the parameter "j" is not decremented if it becomes less than or equal to zero.

Next, the procedures for displaying non-character display data for the j-th non-character area in the step S604 will be described below referring to FIG. 30.

In the step S701, a judgment is made as to whether a new non-character area is selected using the operating unit 15. If a new non-character area is selected (S701: Yes), the process of the step S702 is executed; if no new non-character area is selected (S701: No), the process of the step S704 is executed.

In the step S702, parameters $X_{sc}$ and $Y_{sc}$ that indicate the display positions in the horizontal and vertical directions are initialized to zero for displaying the non-character display data for the j-th non-character area on the screen of the display unit 14. The parameters $X_{sc}$ and $Y_{sc}$ are coordinates based on a pixel on the non-character display data. Further, a pixel count $X_{dd}$ in the horizontal direction and a pixel count $Y_{dd}$ in the vertical direction for the particular non-character display data are obtained. $X_{dd}$ and $Y_{dd}$ are calculated using the horizontal scaling ratio $X_z$ and the vertical scaling ratio $Y_z$.

In the step 703, the particular non-character display data is displayed in such a way that the pixel having the coordinates indicated by the parameters $X_{sc}$ and $Y_{sc}$ is to be located at the origin (e.g., top left corner) of the non-character display area on the screen of the display unit 14. The non-character display area here is an area set up for displaying non-character display data on the screen of the display unit 14.

In the step S704, a judgment is made as to whether an instruction input for right scrolling is made through the operating unit 15. If there is such an instruction input (S704: Yes), the process of the step S705 is executed; if there is no such instruction input (S704: No), the process of the step S706 is executed.

In the step S705, the parameter $X_{sc}$ that indicates the display position in the horizontal direction is incremented by one. However, the parameter $X_{sc}$ is not incremented if the non-character display data is scrolled to the right end.

In the step S706, a judgment is made as to whether an instruction input for left scrolling is made through the operating unit 15. If there is such an instruction input (S706:Yes), the process of the step S707 is executed; if there is no such instruction input (S706: No), the process of the step S708 is executed.

In the step S707, the parameter $X_{sc}$ that indicates the display position in the horizontal direction is decremented by one. However, the parameter $X_{sc}$ is not decremented if the non-character display data is scrolled to the left end.

In the step S708, a judgment is made as to whether an instruction input for down scrolling is made through the operating unit 15. If there is such an instruction input (S708:

Yes), the process of the step S709 is executed; if there is no such instruction input (S708: No), the process of the step S710 is executed.

In the step S709, the parameter $Y_{sc}$ that indicates the display position in the vertical direction is incremented by one. However, the parameter $Y_{sc}$ is not incremented if the non-character display data is scrolled to the lower end.

In the step S710, a judgment is made as to whether an instruction input for up scrolling is made through the operating unit 15. If there is such an instruction input (S710: Yes), the process of the step S711 is executed; if there is no such instruction input (S710: No), the process of the step S703 is executed.

In the step S711, the parameter $Y_{sc}$ that indicates the display position in the vertical direction is decremented by one. However, the parameter $Y_{sc}$ is not decremented if the non-character display data is scrolled to the upper end.

Next, the procedures for displaying character data in the step S208 will be described below referring to FIG. 31.

In the step S801, a judgment is made as to whether a new page is selected using the operating unit 15. If a new page is selected (S801: Yes), the process of the step S802 is executed; if no new page is selected (S801: No), the process of the step S805 is executed.

In the step S802, a judgment is made as to whether the number $N_t$ of characters is not less than 1. If $N_t \geq 1$ holds (S802: Yes), the process of the step S803 is executed; if $N_t \geq 1$ does not hold (S802: No), the process returns to the flowchart shown in FIG. 22.

In the step S803, the parameter "k" corresponding to the leading character of the character data being displayed is initialized to 1.

In the step S804, a character string corresponding to a line of text led by the k-th character is displayed in the specified character display area on the screen of the display unit 14.

In the step S805, a judgment is made as to whether an instruction input for right scrolling is made through the operating unit 15. If there is such an instruction input (S805: Yes), the process of the step S806 is executed; if there is no such instruction input (S805: No), the process of the step S807 is executed.

In the step S806, the parameter "k" corresponding to the leading character of the character data being displayed is incremented by one. However, the parameter "k" is not incremented if the display data has been scrolled to the last character.

In the step S807, a judgment is made as to whether an instruction input for left scrolling is made through the operating unit 15. If there is such an instruction input (S807: Yes), the process of the step S808 is executed; if there is no such instruction input (S807: No), the process of the step S804 is executed.

In the step S808, the parameter "k" corresponding to the leading character of the character data being displayed is decremented by one. However, the parameter "k" is not decremented if the display data has been scrolled to the first character.

Figure 32:
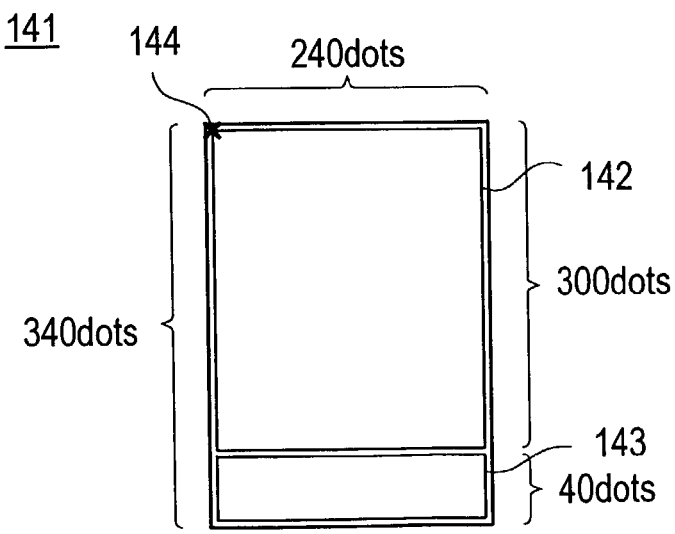
FIG. 32 is a diagram showing a non-character display area and a character display area on the display screen of the portable terminal.

FIG. 32 is a diagram showing a non-character display area and a character display area on the display screen 141 of the display unit 14 of the portable terminal 10. The screen 141, as mentioned before, has pixels of 240 dots in the horizontal direction and 340 dots in the vertical direction, of which the non-character display area 142 for displaying non-character display data has pixels of, e.g., 240 dots*300 dots and the character display area 143 for displaying character data has pixels of, e.g., 240 dots*40 dots. The origin 144 of the non-character display area is, for example, at the top left corner of the area. The method of setting up the non-character display area and the character display area on the screen 141 of the display unit 14, as described above, is just an example, and can be arbitrarily changed.

Figure 33:
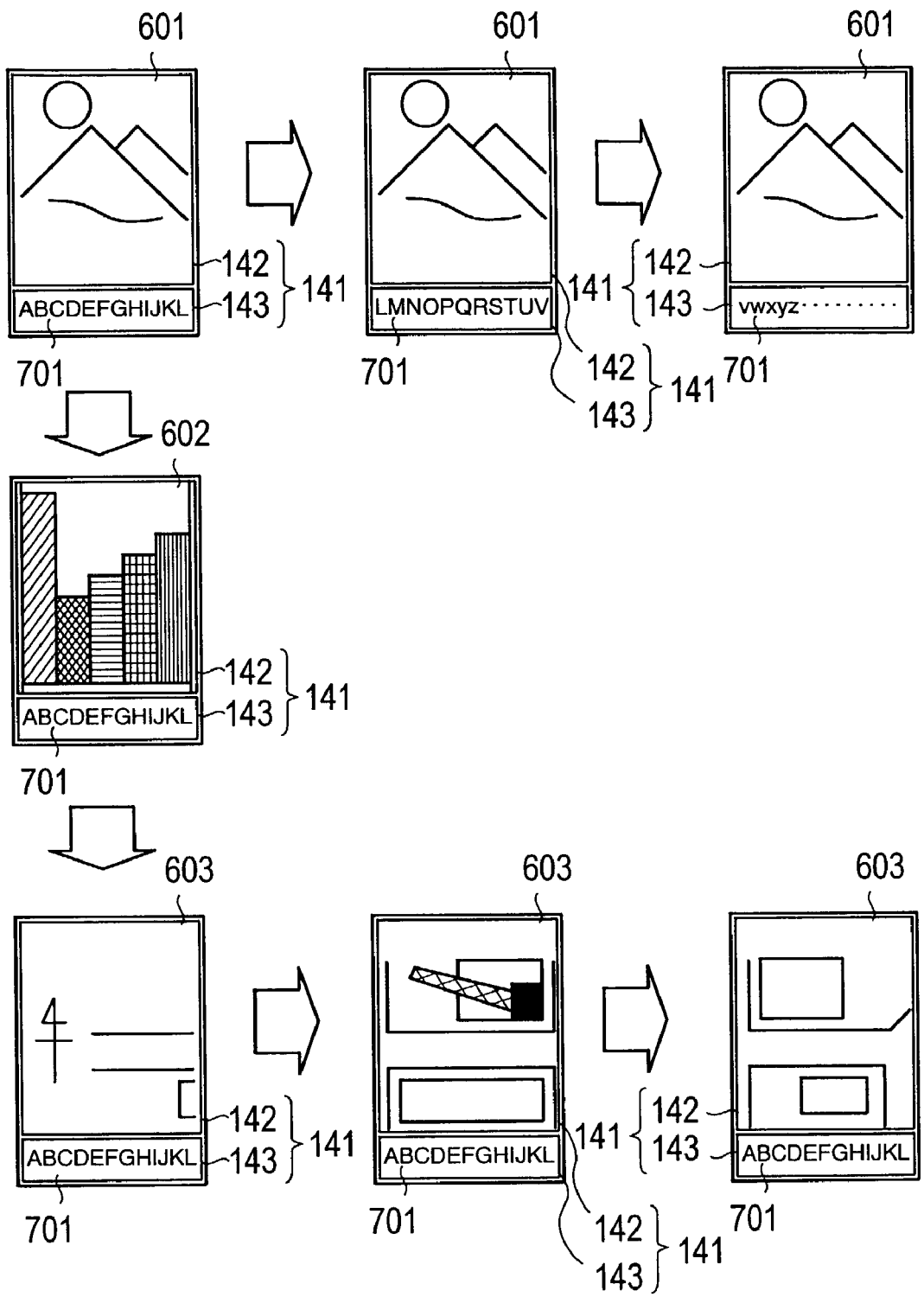
FIG. 33 is a diagram for describing example display images of the image data received by the portable terminal.
Figure 34:
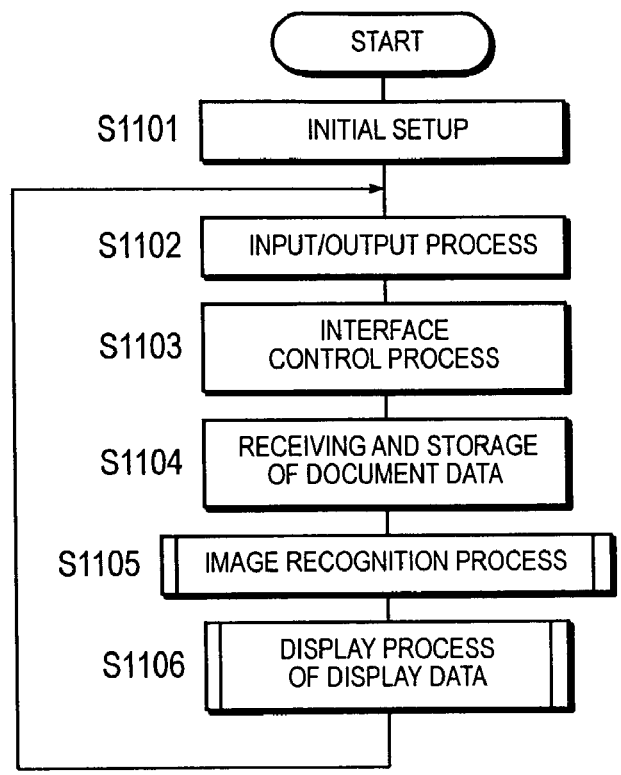
FIG. 34 is a flowchart showing the steps of the data receiving process at the portable terminal of the second embodiment.

FIG. 33 is a diagram for describing example display images of the image data received by the portable terminal 10.

For example, if the image data 500 shown in FIG. 23 is to be displayed on the screen 141 of the display unit 14, a non-character display data 601 for the first non-character area is displayed in the non-character display area 142 as the initial screen, and a character data is displayed as a text data 701 in the character display area 143. If the character control key 151 and the right scroll key 155 are pressed simultaneously under the condition of this initial screen, a text data 701 in the character display area 143 is scrolled to the right.

On the other hand, if the right scroll key 155 is pressed independently under the initial screen condition, non-character display data 602 and 603 for next non-character area will be displayed one after the other. The non-character display data for the non-character area is displayed by scaling the data in such a way as to make the data fit to the size of the non-character display area 142 of the screen 141 in accordance with the aspect ratio limit $L_{xy}$.

If the non-character display data for the non-character area does not fit entirely into the non-character display area 142 when it is scaled according to the shrink ratio limit $L_r$ indicated in the designating information, e.g., if it overflows toward right, the non-character display data 603 shown in the non-character display area 142 can be scrolled toward right by pressing the non-character operating key 152 and the right scroll key 155 simultaneously.

The instruction input by means of keys is detected by detecting whether each key is pressed. Therefore, if the character operating key 151 and the right scroll key 155 are pressed simultaneously and continuously, the text data 701 on the character display area 143 will be continuously scrolled toward right. However, the instruction input by keys can be detected by detecting whether the status of a key is changed from a pressed condition to a not-pressed condition, in which case it is possible to adopt a scheme of scrolling a certain amount each time when the key is pressed.

As can be seen in the above, it is possible according to this embodiment to separate character areas from non-character areas when a document data containing a mixture of character data, photographic data, graphic data, etc., is received by a portable terminal, designate a data display method for each area, and output to display the document data on the screen of the display unit according to the display method. This makes it possible for the receiving side user to recognize the contents of the received document data clearly by means of the display unit of the portable terminal.

Moreover, since the designating information concerning the data display method is added to the document data, it is possible to set up the display method suitable for the particular document data on the receiving side. Therefore, it is possible for the receiving side user to recognize the contents of the received document data more clearly.

Next, the second embodiment of the present invention will be described below. The second embodiment differs from the first embodiment described above in that the designating information concerning the data display method is not added to the document data received by a portable terminal. The following descriptions on the second embodiment will focus on the points that are different from the first embodiment and descriptions of the features that are common to the embodiments will be omitted.

The procedures of the data reception by the portable terminal 10 of the second embodiment will be described below referring to FIG. 34, FIG. 36 through FIG. 41. The algorithm indicated by the flowcharts of FIG. 34 and FIG. 36 through FIG. 41 is stored in the ROM 12 of the portable terminal 10 and is executed by the CPU 11.

First, in the step S1101, the initialization including the setup of he initial screen display is executed as the power for the portable terminal 10 is turned on. In the step S1102, various input/output process such as the detection of the key input is executed through the operating unit 15. When a proper termination instruction is issued in this process, the execution of the control program will be terminated. In the step S1103, the interface control process such as data reception from external equipment will be executed.

In the step S1104, the document data transmitted by other equipment such as the computer 30 is received and the received document data is stored in the RAM 13.

Figure 35:
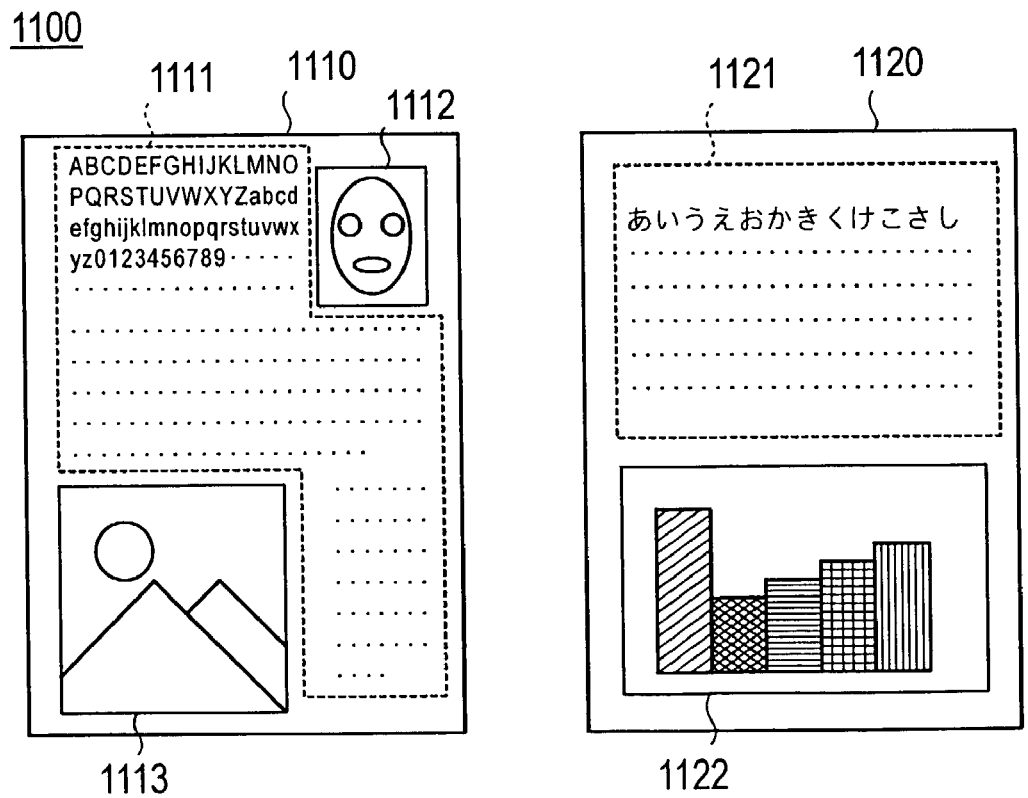
FIG. 35 shows an example received document data.

FIG. 35 shows an example received document data. A document data 1100 shown in FIG. 35 consists of data 1110 and 1120 extending over two pages. The data 1110 on the first page consists of a character area 1111 where character data exists and photographic areas 1112 and 1113 where photographic data exist. The data 1120 on the second page consists of a character area 1121 where character data exists and graphic areas 1122 where graphic data exists. The character data in character area 1121 shows Japanese characters. The photographic areas 1112 and 1113 as well as the graphic area 1122 are non-character areas where non-character data exist.

In the step S1105, an image recognition process is executed to separate character areas from non-character areas on the received document data. The detail of this image recognition process will be described later.

In the step S1106, the display data is prepared based on the received document data for displaying on the screen of the display unit 14 of the portable terminal 10, and the data display process for displaying the display data is executed. The detail of this data display process will be described later. When the step S1106 is finished, the process returns to the step S1102.

It goes without saying that the portable terminal 10 of the present embodiment will be used for various purposes other than the process of displaying the received document data.

Figure 36:
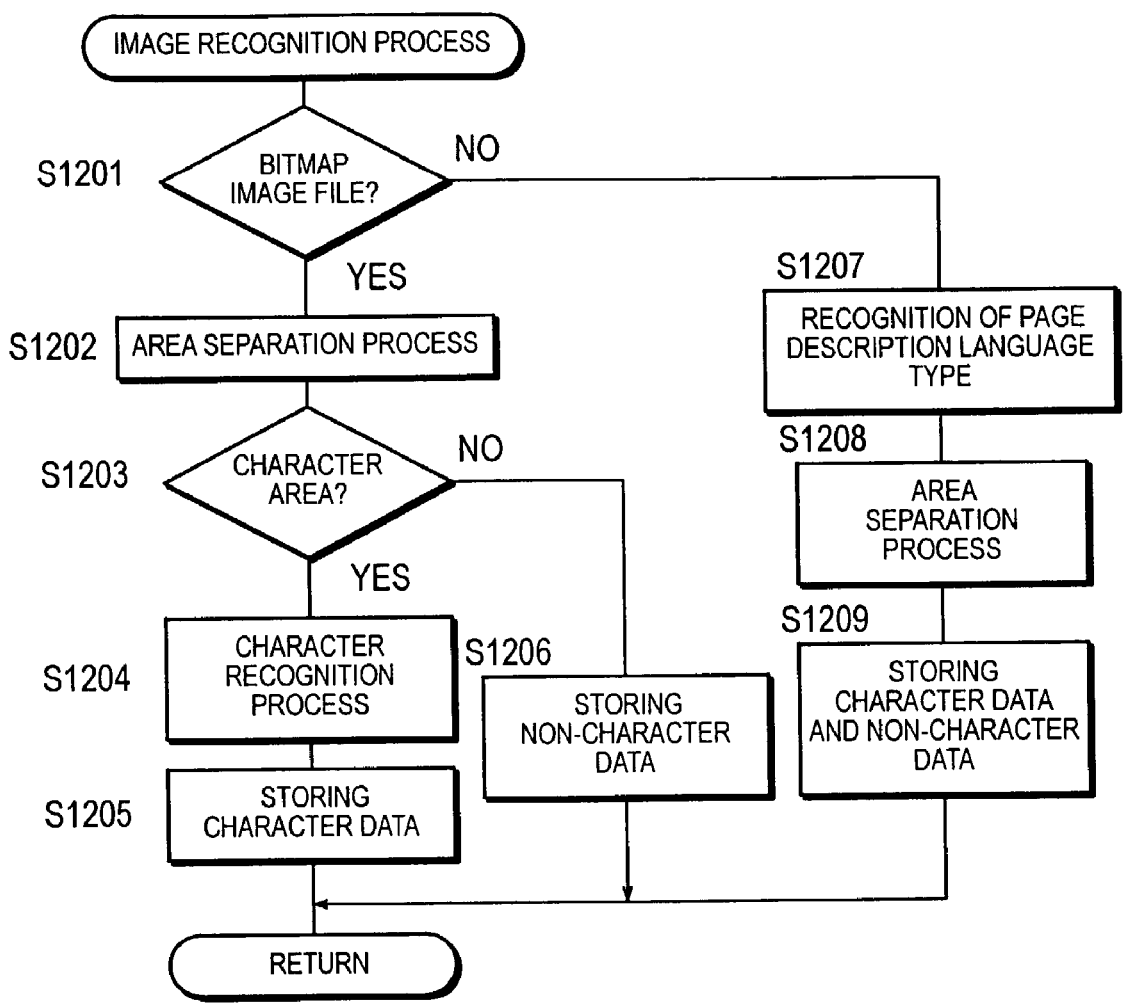
FIG. 36 is a flowchart showing the process of an image recognition process.

Next, referring to FIG. 36, the image recognition process in the step S1105 will be described below.

In the step S1201, a judgment is made as to whether a document data received from other equipment, e.g., the computer 30, is a bitmap image file. If the document data is a bitmap image file (S1201: Yes), the process of the step S1202 is executed; if the document data is not a bitmap image file (S1201: No), the process of the step S1207 is executed. In other words, the judgment is made on the type of the received document data in this step.

In this specification, it is construed that there are two types of document data; a bitmap image file, such as a TIFF (tagged image file format) and a BMP (bitmap) file; and a data file written in a page description language such as Postscript® and PDF (portable document format). A bitmap image file is a file consisting of bitmap data wherein an image is expressed as an assembly of pixels. On the other hand, a data file written in a page description language has character data and non-character data, each of which is an object that can be independently operated, wherein, in general, character data consists of character code data that expresses characters in codes, and non-character data consists of bitmap data.

In the step S1202, an area separation process is executed for separating from the received document data 1100 character areas where character data exist and non-character areas where non-character data such as photographic or graphic data exist. In this area separation process, generally, feature values regarding the attributes of an image are extracted based on the edge components and the distribution of density levels detected on each minute area of the image data, and character areas and non-character areas are recognized based on the extracted feature values.

In the step S1203, a judgment is made as to whether the area currently being processed is a character area. If the area is a character area (S1203: Yes), the process of the step S1204 is executed; if the area is not a character area (S1203: No), the process of the step S1206 is executed.

In the step S1204, the character recognition process is executed for the character area. Specifically, a particular character is recognized from a character data as an image, i.e., a character image, in the character area. The method of identifying a particular character from a character image is performed, for example, based on the degree of matching between the feature values of each character image and the dictionary patterns stored in the ROM 12. Specifically, in this character recognition process, a character code is recognized from character images in the character area, and character data is generated expressed in the recognized character code.

In the step S1205, the character data expressed in the character code obtained in the character recognition process in the step S1204 is stored in the RAM 13.

In the step S1206, the non-character data in the non-character data is stored for each area as bitmap data into the RAM 13.

The processes in the step S1203 through S1206 are executed for all the areas included in the document data.

On the other hand, in the step S1207, the type of the page description language used in the document data 1100 is recognized.

In the step S1208, character areas where character data exist are separated from non-character areas where non-character data such as photographic or graphic data exist according to the type of page description language recognized in the step S1207.

In the step S1209, character data or non-character data are stored independently in the RAM 13 for each area separated in the step S1208.

Next, the procedures for displaying display data in the step S1106 will be described below referring to FIG. 37 and FIG. 38.

In the step S1301, the non-character data and the non-character data stored in the RAM 13 are retrieved onto the working area of the RAM 13.

In the step S1302, the number of characters contained in the character data file retrieved in the step 1301 is counted. The count value is substituted into the parameter $N_t$ that represents the number of characters.

In the step S1303, the number of non-character data files retrieved in the step S1301 is counted. The count value is substituted into the parameter $N_f$ that indicates the number of non-character data files.

In the step S1304, a parameter "i" that indicates the order number of the non-character data file currently being processed is initialized to 1.

In the step S1305, the process of preparing the non-character display data concerning the i-th non-character data file is executed. The detail procedures for preparing this non-character display data will be described later.

In the step S1306, the parameter "i" is incremented by one.

In the step S1307, a judgment is made as to whether the parameter "i" is greater than the number $N_f$ of non-character data files, i.e., whether the process of preparing the non-character display data has been completed to the last non-character data file. If the process is completed to the last non-character data file (S1307: Yes), the process S1308 is executed; if the process is not yet completed to the last non-character data file (S1307: No), the steps S1305 through S1307 will be repeated.

In the step S1308, a process for displaying non-character display data is executed on the screen of the display unit 14 of the portable terminal 10. The detail of this display process of non-character data will be described later.

In the step S1309, a process is executed for displaying character data on the screen of the display unit 14 of the portable terminal 10. The detail of this character data display process will be described later.

In the step S1310, a page switching process is executed for switching the page to be displayed on the screen of the display unit 14 of the portable terminal 10. Specifically, when the page down/downward scroll key 153 shown in FIG. 3 are pressed independently, the display page advances to the next page, while the page up/upward scroll key 154 are pressed independently, the displayed page returns to the previous page.

In the step S1311, a judgment is made as to whether applications other than the data display process are initiated. When other applications are initiated (S1311: Yes), the process returns to the flowchart shown in FIG. 34; if no other applications are initiated (S1311: No), the processes of the steps S1308 through S1311 are repeated.

Figure 37:
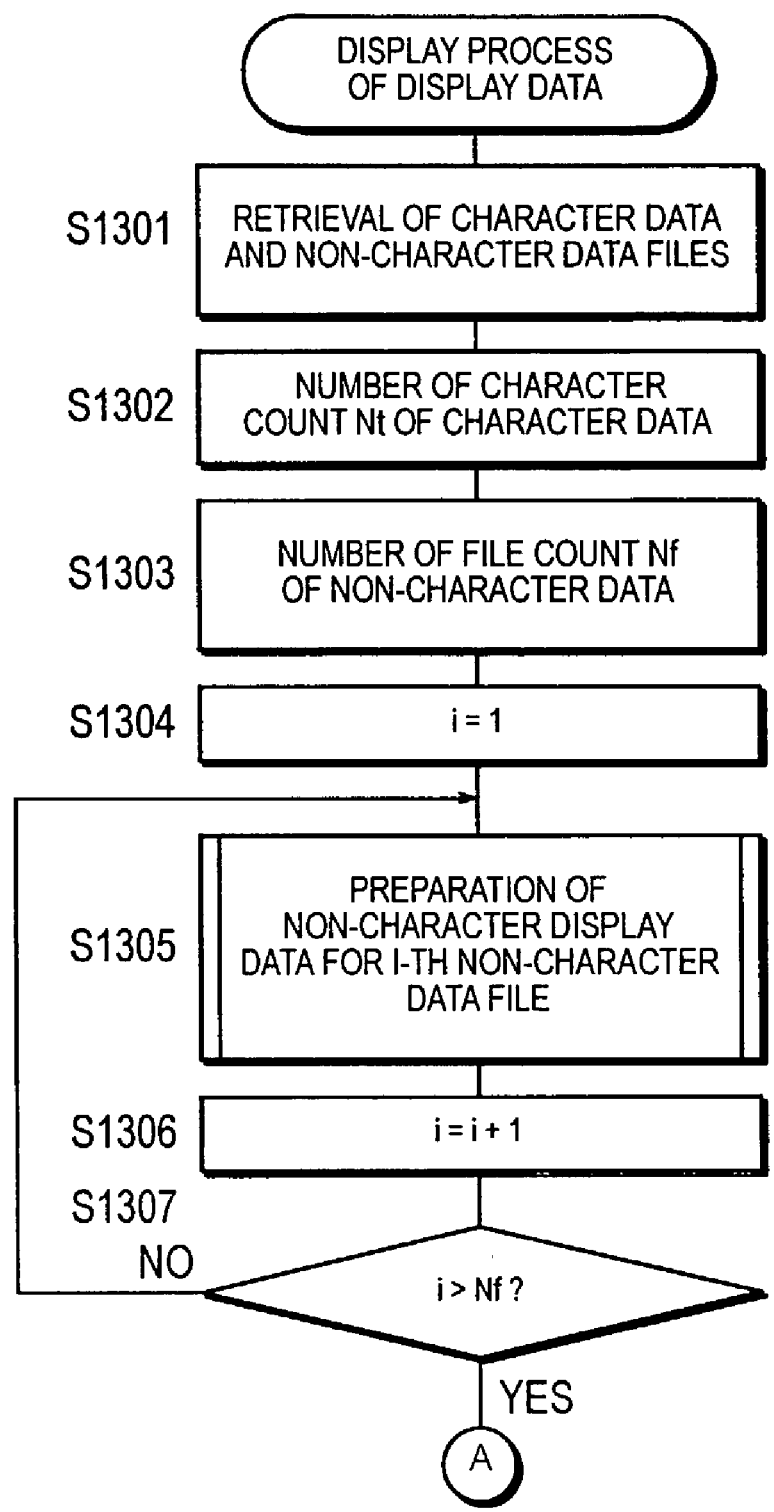
FIG. 37 is a flow chart showing the process of displaying display data.

If either character data or non-character data exists in the document data in the display process of the display data shown in FIG. 37, the display process for non-existing data is skipped.

Figure 39:
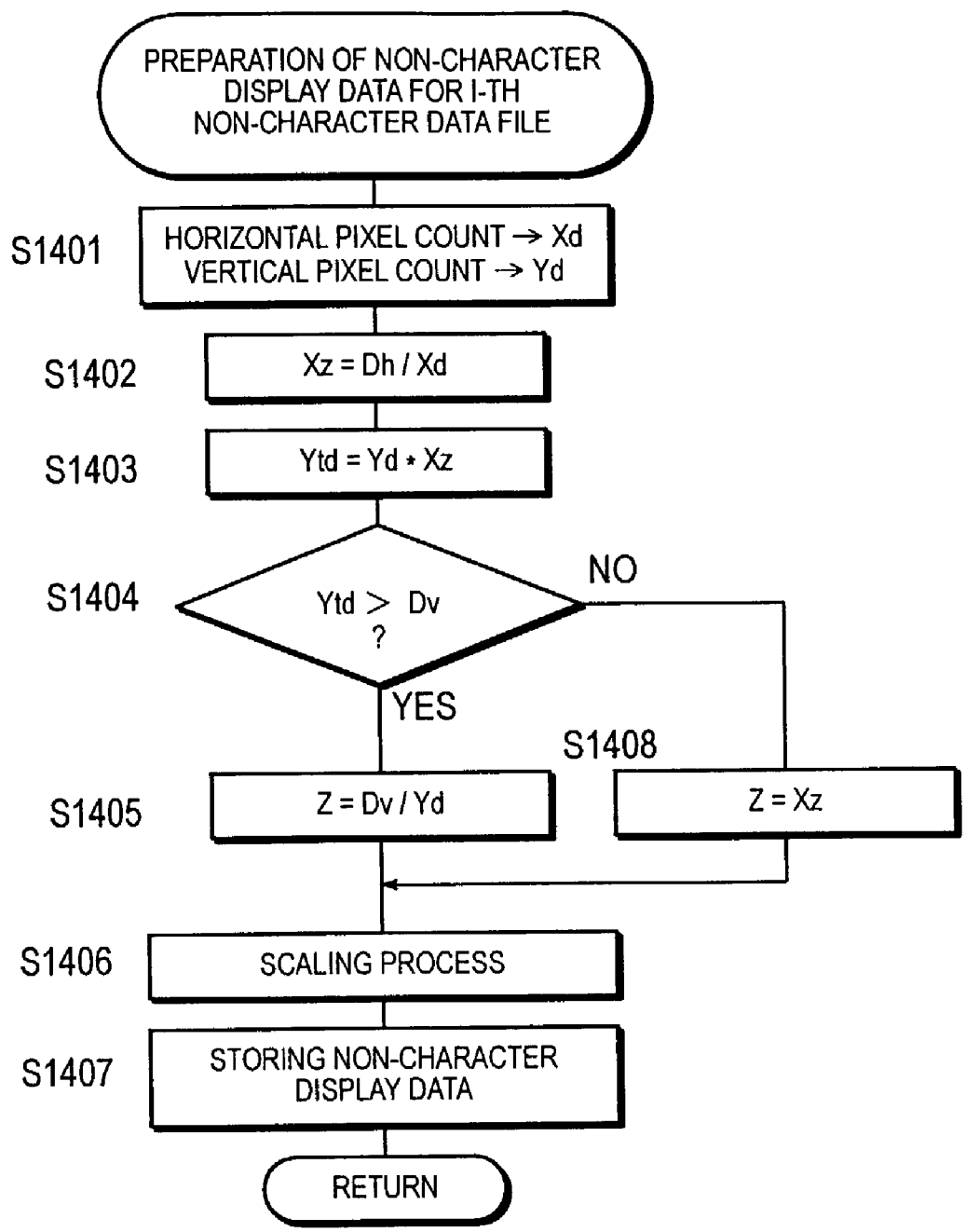
FIG. 39 is a flowchart showing the process of preparing non-character display data for the i-th non-character data.

Next, the procedures for preparing non-character display data for the j-th non-character data file in the step S1305 will be described below referring to FIG. 39.

In the step S1401, the horizontal direction pixel count of the particular non-character data is substituted into the parameter $X_d$, and the vertical direction pixel count is substituted into the parameter $Y_d$ concerning the i-th non-character data file.

In the step S1402, the calculation result for obtaining the scaling ratio $X_z$ in the horizontal direction by dividing the horizontal direction pixel count $D_h$ (e.g., 240 dots) of the non-character data display area by the horizontal pixel count $X_d$ of the non-character data is substituted into the parameter $X_z$.

In the step S1403, the calculation result obtained by multiplying the vertical direction pixel count $Y_d$ by the horizontal scaling ratio $X_z$ is substituted into the parameter $Y_{td}$.

In the step S1404, a judgment is made as to whether $Y_{td}$ obtained in the step S1403 is greater than the horizontal direction pixel count $D_v$ (e.g., 280 dots) of the non-character data area. If $Y_{td} > D_v$ holds (S1404: Yes), the process of the step S1405 is executed; if $Y_{td} > D_v$ does not hold (S1404: No), the process of the step S1408 is executed.

In the step S1405, the calculation result obtained by dividing the horizontal direction pixel count $D_v$ of the non-character data display area by the vertical direction pixel count $Y_d$ of the non-character data is adopted as the scaling ratio Z. On the other hand, the parameter $X_z$ is adopted as the scaling ratio Z in the step S1408.

In the step S1406, the scaling process is executed on the i-th non-character data using the scaling ratio Z.

In the step S1407, the non-character display data obtained by the scaling process is stored as a file.

Figure 40:
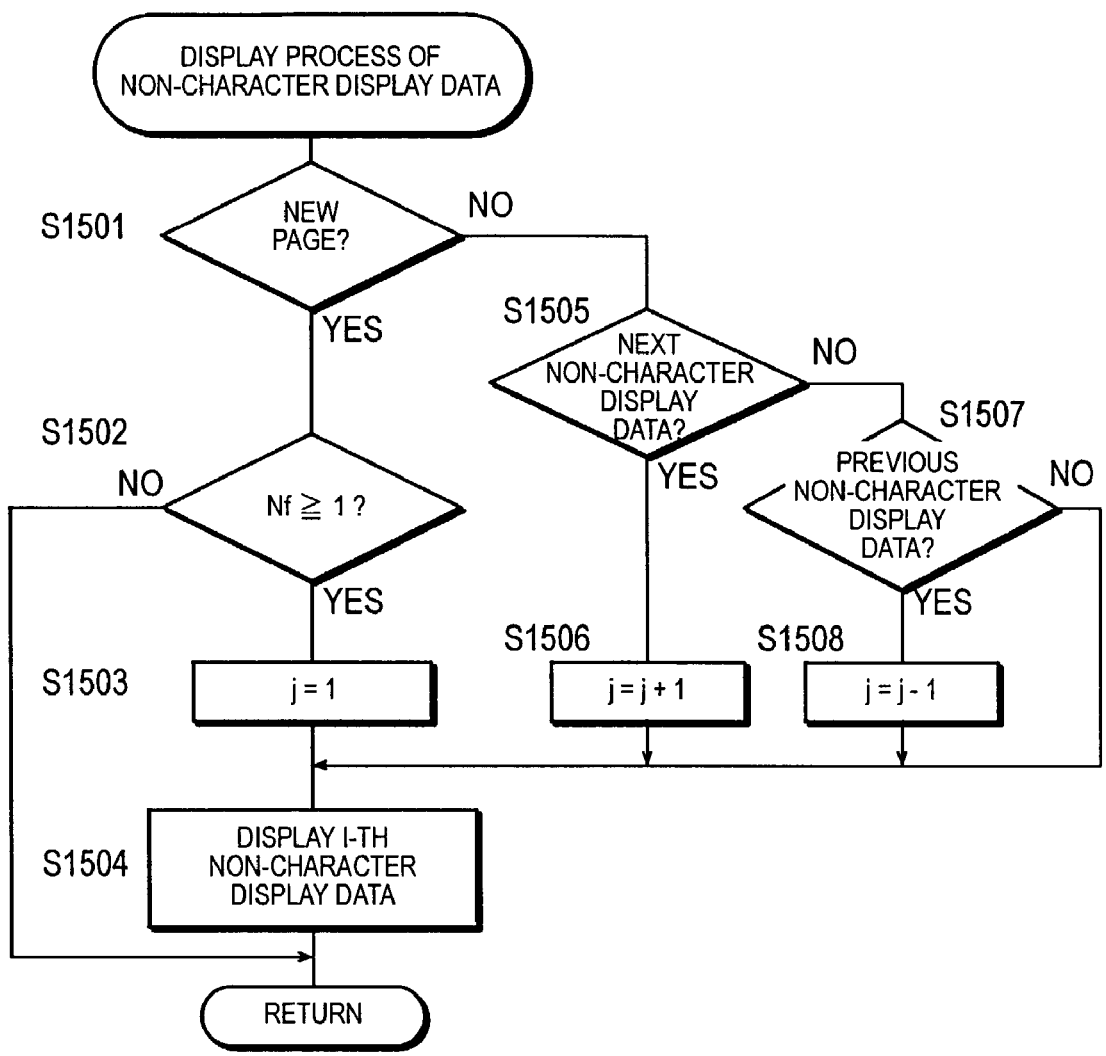
FIG. 40 is a flow chart showing the process of displaying non-character display data.
Figure 41:
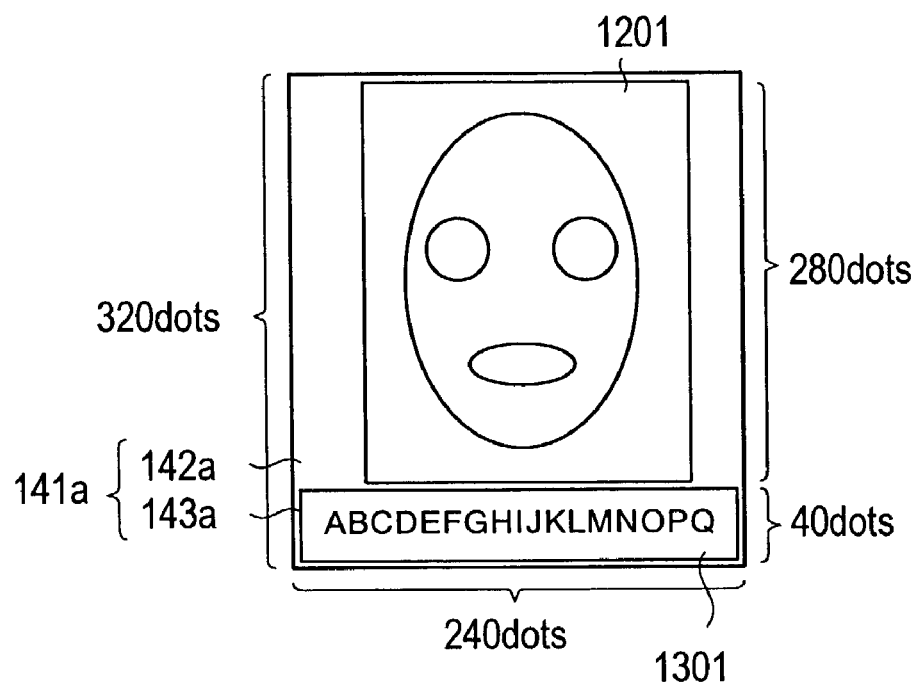
FIG. 41 is a diagram for describing an example display image of the document data received by the portable terminal according to the second embodiment.

Next, the procedures for displaying non-character display data in the step S1308 will be described below referring to FIG. 40.

In the step S1501, a judgment is made as to whether a new page is selected using the operating unit 15. If a new page is selected (S1501: Yes), the process of the step S1502 is executed; if no new page is selected (S1501: No), the process of the step S1505 is executed.

In the step S1502, a judgment is made as to whether the file count $N_f$ of the non-character display data is not less than 1. If $N_f \geq 1$ holds (S1502: Yes), the process of the step S1503 is executed; if $N_f \geq 1$ does not hold (S1502: No), the process advances to the step S1309 shown in FIG. 38.

In the step S1503, a parameter "j" that indicates the order number of the non-character data file currently being processed is initialized to 1.

In the step S1504, the display process is executed on the j-th non-character display data file.

In the step S1505, a judgment is made as to whether any instruction input for displaying the next non-character display data is made through the operating unit 15. If there is such an instruction input (S1505: Yes), the process of the step S1506 is executed; if there is no such instruction input (S1505: No), the process of the step S1507 is executed.

In the step S1506, the parameter "j" is incremented by one. However, the parameter "j" is not incremented, if it is larger than the number $N_f$ of the non-character display data files.

In the step S1507, a judgment is made as to whether any instruction input for displaying the previous non-character display data file is made through the operating unit 15. If there is such an instruction input (S1507: Yes), the process of the step S1508 is executed; if there is no such instruction input (S1507: No), the process of the step S1504 is executed.

In the step S1508, the parameter "j" is decremented by one. However, the parameter "j" is not decremented if it becomes less than or equal to zero.

Figure 31:
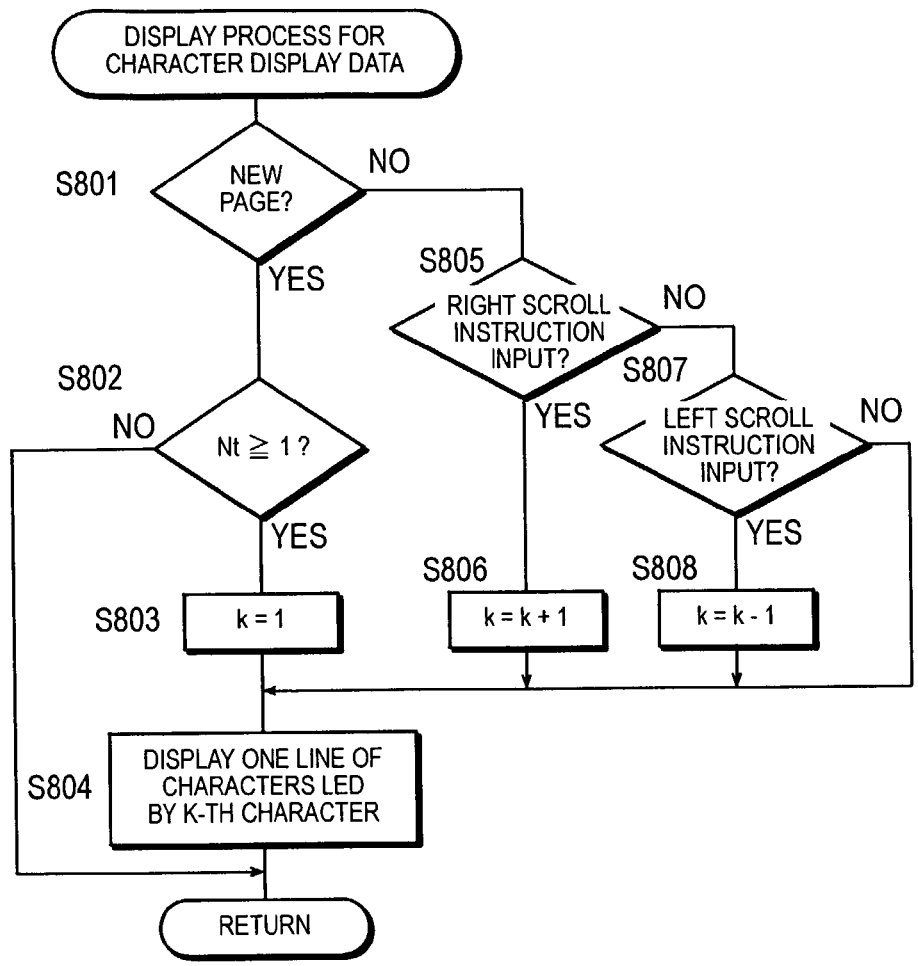
FIG. 31 is a flow chart showing the process of displaying character data.
Figure 38:
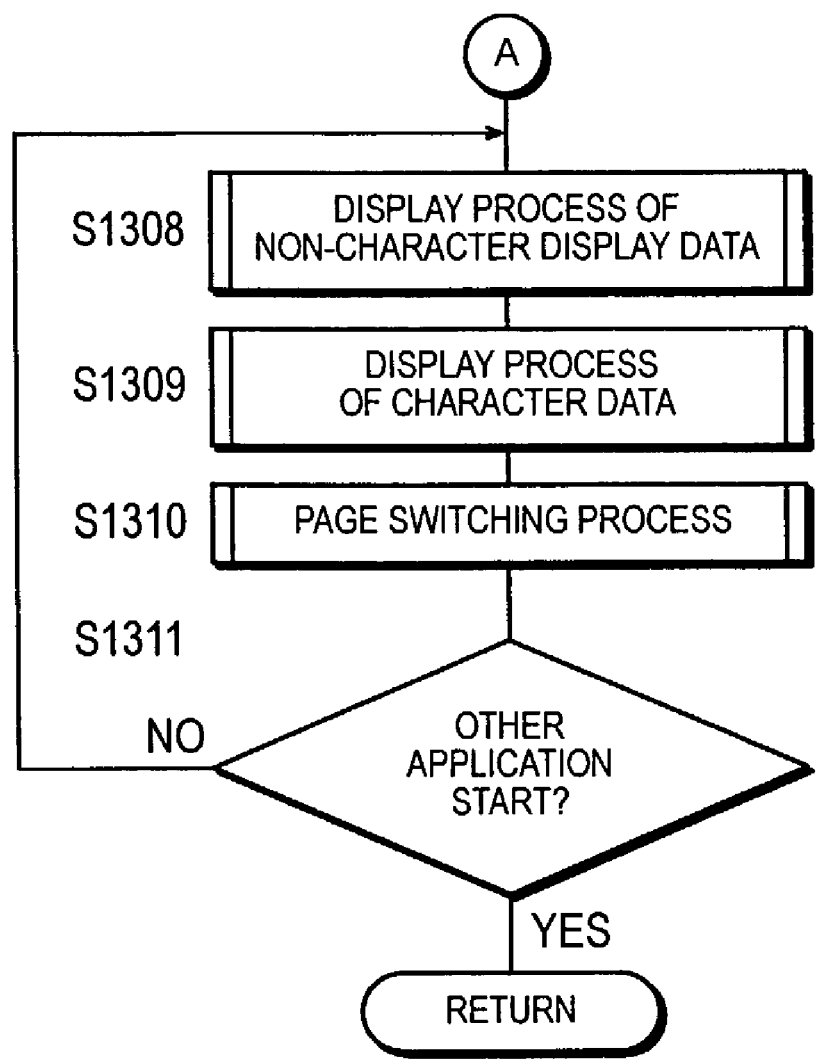
FIG. 38 is a flow chart showing the process of displaying display data in continuation of FIG. 37.

As to the procedures of displaying the character data in the step S1309 shown in FIG. 38, it is identical to those for displaying the character data in the first embodiment shown in FIG. 31 so that the description is not repeated here.

FIG. 41 through FIG. 44 are diagrams for describing an example display image of the document data received by the portable terminal 10 according to the second embodiment.

The screen 141a of the display unit 14 of the portable terminal 10 in the second embodiment has pixels of 240 dots in the horizontal direction and 320 dots in the vertical direction, of which the non-character display area 142a for displaying non-character display data has pixels of, e.g., 240 dots*280 dots and the character display area 143a for displaying character data has pixels of, e.g., 240 dots*40 dots. The origin of the non-character display area is, for example, at the top left corner of the area.

Figure 42:
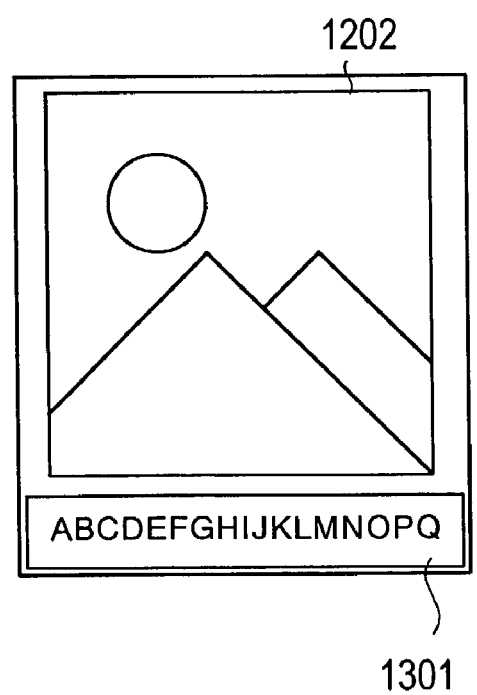
FIGS. 42 through 44 are diagrams showing examples wherein the display image is modified by key operations.
Figure 43:
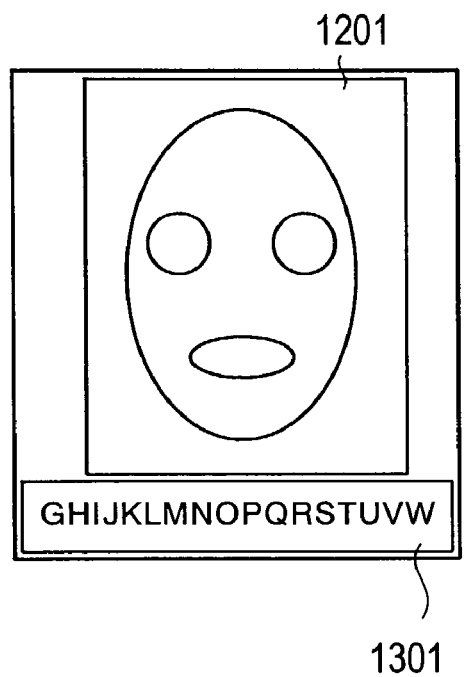
Figure 44:
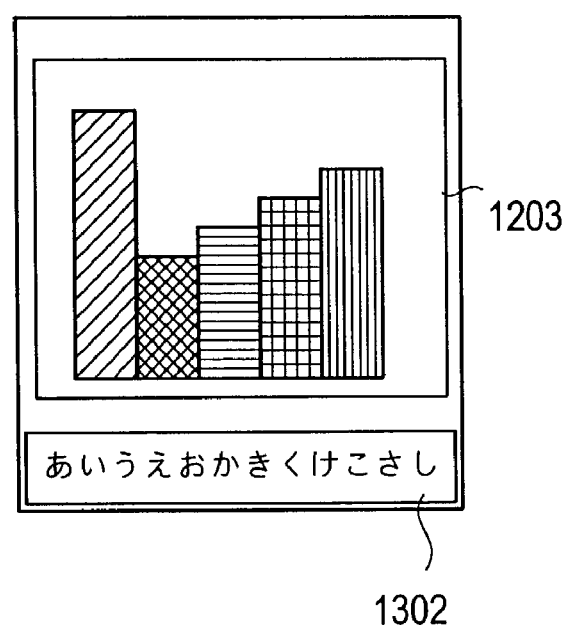

For example, if the document data 1100 shown in FIG. 35 is to be displayed on the screen 141a of the display unit 14, a non-character display data 1201 for the first file is displayed in the non-character display area 142a as the first screen, and a character data is displayed as a text data 1301 in the character display area 143a. When the right scroll key 155 is pressed under this initial screen condition, the display switches to the non-character data 1202 for the next file in the same page as shown in FIG. 42. When the left scroll key 156 is pressed under the condition shown in FIG. 42, the display returns to the non-character display data 1201 for the first file shown in FIG. 41. On the other hand, if the character control key 151 and the right scroll key 155 are pressed simultaneously under the condition of the initial screen, a text data 1301 in the character display area 143a is scrolled to the right as shown in FIG. 43. Further, if the character operating key 151 and the left scroll key 156 are pressed simultaneously under the condition shown in FIG. 43, the text data 1301 in the character display area 143a will be scrolled left, and the display returns to the condition shown in FIG. 41. Further, if, for example, the page down/downward scroll key 153 is independently pressed, the display switches to the next page as shown in FIG. 44. FIG. 44 shows that a non-character display data 1203 is displayed in the non-character display area 142a and a text data 1302 in the character display area 143a. The text data 1302 shows Japanese characters. Further, if, for example, the page up/upward scroll key 154 is pressed independently under the condition shown in FIG. 44, the display returns to the condition shown in FIG. 41.

Figure 45:
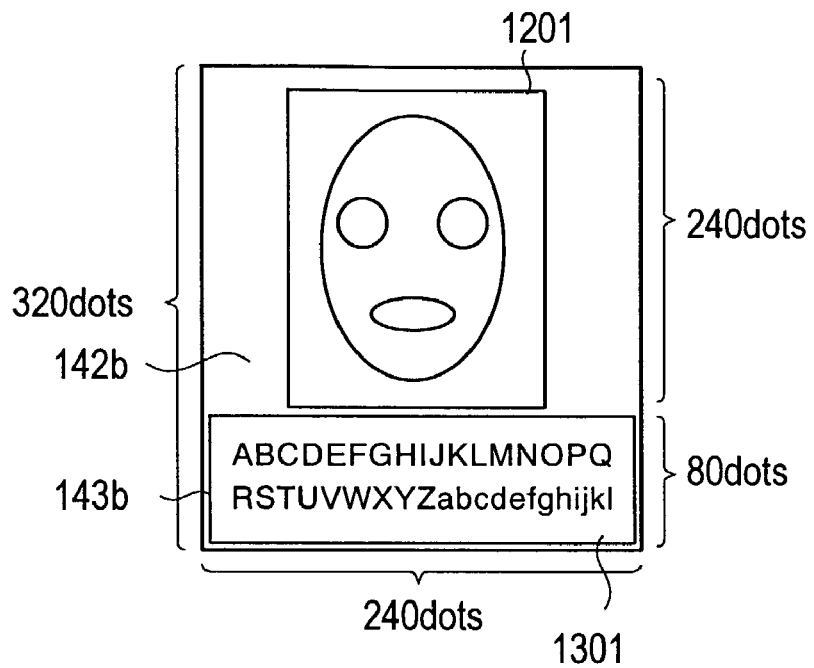
FIG. 45 is a diagram for describing another example display image of the document data received by the portable terminal.
Figure 46:
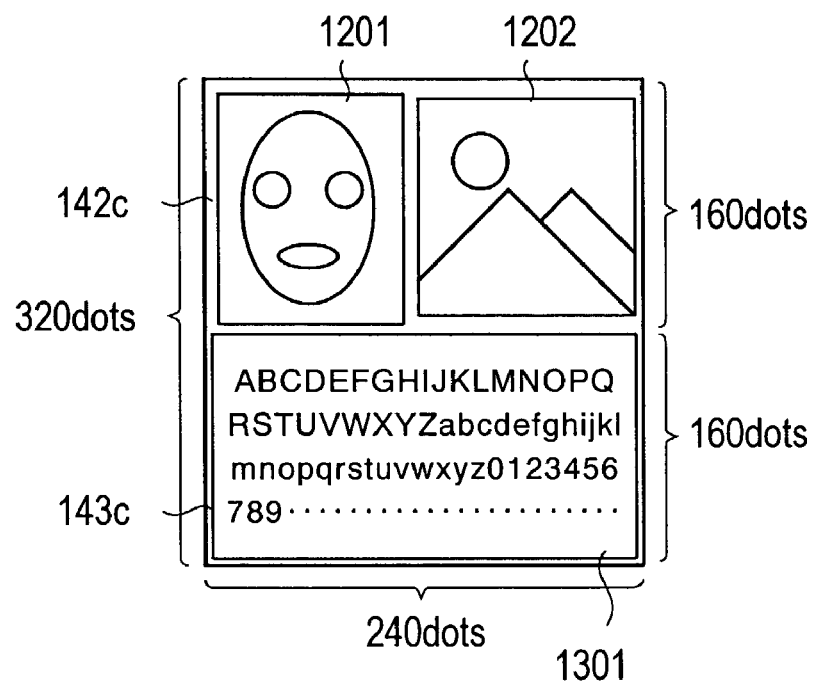
FIG. 46 is a diagram for describing still another example display image of the document data received by the portable terminal.

Moreover, the method of setting up the non-character display area and the character display area on the screen 14, as described above, is just an example, and can be arbitrarily changed. For example, the character display area is not limited to the character display area 143a where a character string corresponding to a line of text as shown in FIG. 41 through FIG. 44, but rather can be character display areas 143b and 143c where multiple lines of text are simultaneously displayed as shown in FIG. 45 and FIG. 46. In this case, it is possible to assign a number of characters corresponding to a line of text to the number of characters to be incremented or decremented instead of using a method of scrolling character by character. This will make it possible to scroll the text data in the vertical direction line by line using the character operating key 151 and the right scroll key 155 or the left scroll key 156 together.

Figure 47:
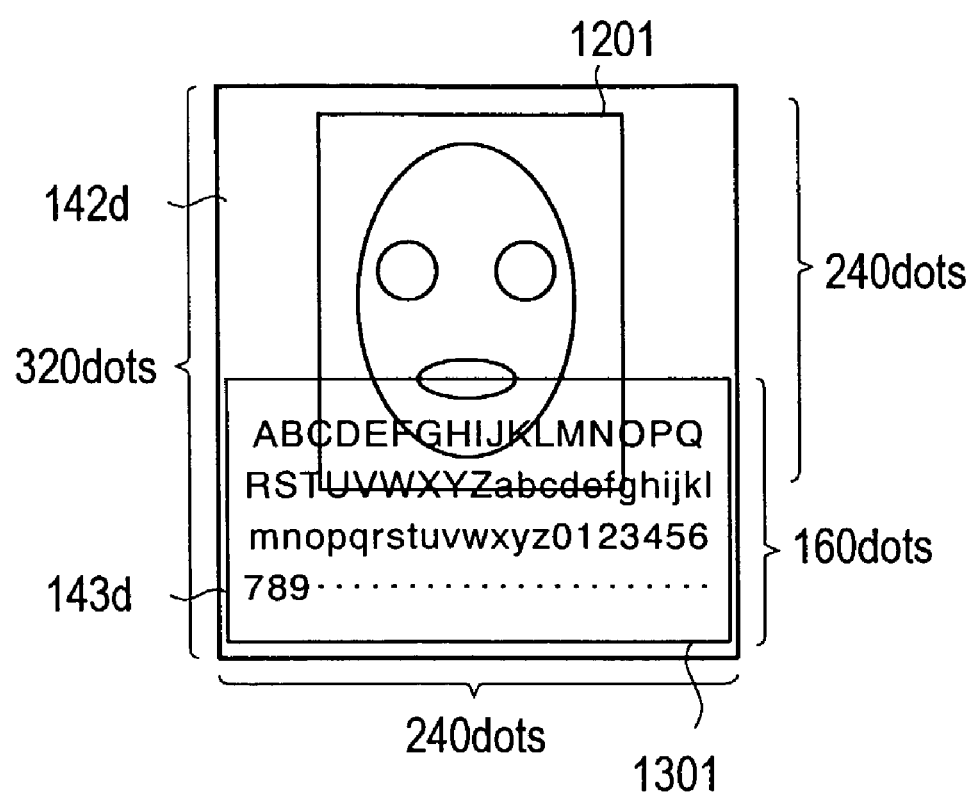
FIG. 47 is a diagram for describing a further example display image of the document data received by the portable terminal.

Further, the non-character display area does not have to be limited to a non-character display area 142a where the non-character display data for a single file is displayed as shown in FIG. 41 through FIG. 44, but also can be a non-character display area 142c where non-character display data of multiple files are displayed simultaneously as shown in FIG. 46. Furthermore, it is possible to set up in such away that the non-character display area 142d and the character display area 143d are set up to overlap each other as shown in FIG. 47.

As can be seen in the above, it is possible according to this embodiment to separate character areas from non-character areas when a document data containing a mixture of character data, photographic data, graphic data, etc., is received by a portable terminal, designate a data display method for each area, and output to display the document data according to the display method. This makes it possible for the receiving side user to recognize the contents of the received document data clearly by means of the display unit of the portable unit.

The invention is not limited to the embodiments described above, but rather can be modified in various ways within the scope of the claims.

For example, although it was assumed in the embodiments described above that the portable terminal is a PDA, the portable terminal of the present invention is not limited to a PDA, but rather the portable terminal can be a device such as a cellular telephone, PHS®, a laptop PC, and an electronic notebook. Further, although it was assumed in the embodiments described above that the data transmission device is a computer, the data transmission device of the present invention is not limited to a computer, but rather the data transmission device can be a device such as a scanner, a facsimile, multiple function peripheral equipment (MFP), a server and a portable terminal.

Further, although the first embodiment was described for a case of transmitting image data obtained by a scanner, the image data can be converted to various types of files, e.g., PDF, and then transferred. Further, although a case of adding the designating information to a document data using the electronic watermarking method, it is possible to use a method of adding the designating information in such a way that the information is not displayed as an output image, for example, being transparent.

Various means of controls and arithmetic processes in the data display system as well as data display method according to the present invention can be realized either by a dedicated hardware circuit or a programmed computer. In realizing the present invention with a programmed computer, the program for operating the data transmission device or the portable terminal can be provided by a computer readable recording medium (such as flexible disks and CD-ROMs). In such a case, the program stored on the computer readable recording medium is normally transferred to and stored on a hard disk. This program can be provided, for example, as independent application software, or can be built into the software of the data transmission device or the portable terminal as a part of the device's function.

What is claimed is:

1. A data display system comprising:
a portable terminal having a communication function; and
a data transmission device capable of communicating with said portable terminal, wherein:
said data display system is intended for displaying data transmitted by the data transmission device on said portable terminal;
said data transmission device includes
an area separation unit for separating a character area where character data exists and a non-character area where non-character data exists from document data containing character data and non-character data for transmission to said portable terminal,
a display method designating unit for designating an individual display method for each kind of separated area, according to a designation by a user, for the display of data at said portable terminal,
a designating information adding unit for adding designating information concerning the designated display method to the document data, and
a transmitting unit for transmitting the document data including the designating information to said portable terminal; and
said portable terminal includes
a receiving unit for receiving the document data from said data transmission device,
a designating information detecting unit for detecting the designating information from the document data, and
a display unit for displaying the document data as an output image based on the designating information.

2. A data display system as claimed in claim 1, wherein said designating information adding unit is operable to add the designating information by replacing a portion of the document data with the designating information to embed the designating information in the document data.

3. A data display system as claimed in claim 2, wherein said designating information adding unit is operable to replace a least significant bit of the document data with the designating information to embed the designating information in the document data.

4. A data display system as claimed in claim 2, wherein:
said display method designating unit is operable to designate the individual display method for each kind of separated area as non-binary data; and
said designating information adding unit is operable to convert the non-binary data of the designated display method into the designating information as binary data, and add the converted designating information to the document data by replacing a least significant bit of the document data with the converted designating information.

5. A data display system as claimed in claim 1, wherein said non-character data is photographic or graphic data.

6. A data transmission device to be used in a system including a portable terminal having a communication function and the data transmission device capable of communicating with the portable terminal, wherein said system is intended for displaying data transmitted by the data transmission device on the portable terminal, said data transmission device comprising:
an area separation unit for separating a character area where character data exists and a non-character area where non-character data exists from document data containing character data and non-character data for transmission to said portable terminal;
a display method designating unit for designating an individual display method for each kind of separated area, according to a designation by a user, for the display of data at said portable terminal;
a designating information adding unit for adding designating information concerning the designated display method to the document data; and
a transmitting unit for transmitting the document data including the designating information to said portable terminal.

7. A data transmission device as claimed in claim 6, wherein
the designating information is embedded in said document data so that the designating information is not separately visible when the document data is output as an image at the portable terminal.

8. A data transmission device as claimed in claim 6, wherein
said non-character data is photographic or graphic data.

9. A data transmission device as claimed in claim 6, wherein
said display method designating unit is operable to designate a scroll display mode for said character area according to the designation by the user.

10. A data transmission device as claimed in claim 6, wherein
said display method designating unit is operable to designate a display scaling ratio for said non-character area according to the designation by the user.

11. A data transmission device as claimed in claim 6, further comprising:
a scanning unit for obtaining image data by scanning documents, wherein
said document data is the image data obtained by said scanning unit.

12. A data transmission device as claimed in claim 6, further comprising:

a character recognition unit for obtaining character code data by recognizing character code from character data in said character area; and a character code data adding unit for adding said character code data to the document data.

13. A data transmission device as claimed in claim 6, wherein said designating information adding unit is operable to add the designating information to the document data by replacing a portion of the document data to embed the designating information in the document data.

14. A data transmission device as claimed in claim 13, wherein said designating information adding unit is operable to replace a least significant bit of the document data with the designating information to embed the designating information in the document data.

15. A data transmission device as claimed in claim 13, wherein:

said display method designating unit is operable to designate the individual display method for each kind of separated area as non-binary data; and said designating information adding unit is operable to convert the non-binary data of the designated display method into the designating information as binary data, and add the converted designating information to the document data by replacing a least significant bit of the document data with the converted designating information.

16. A portable terminal to be used in a system including the portable terminal having a communication function and a data transmission device capable of communicating with the portable terminal, wherein said system is intended for displaying data transmitted by the data transmission device on the portable terminal, said portable terminal comprising:

a receiving unit for receiving document data containing character data and non-character data from the data transmission device;

an area separating unit for separating a character area where character data exists and a non-character area where non-character data exists from the document data;

a display method designating unit for designating an individual display method for each kind of separated area, according to a designation of the individual display method for each kind of separated area executed by a user; and a display unit for displaying the document data as an output image based on the designated display method.

17. A portable terminal as claimed in claim 16, wherein said non-character data is photographic or graphic data.

18. A portable terminal as claimed in claim 16, wherein said display method designating unit is operable to designate the display method by designating a display scaling ratio or designating a scroll display mode according to the designation by the user.

19. A portable terminal as claimed in claim 16, wherein said display method designating unit is operable to designate a scroll display mode for said character area according to the designation by the user.

20. A portable terminal as claimed in claim 16, wherein said display method designating unit is operable to designate a display scaling ratio for said non-character area according to the designation by the user.

21. A portable terminal as claimed in claim 16, further comprising:

a character recognition unit for obtaining character code data by recognizing character code from character data in said character area; wherein said display unit is operable to display said character code data as an output image.

22. A portable terminal as claimed in claim 16, wherein:

the document data received by said receiving unit additionally contains designating information replacing a portion of the document data to be embedded therein and concerning a designated display method for displaying the document data;

said portable terminal further comprises a designating information detecting unit for detecting the designating information embedded in the document data; and said display method designating unit is operable to designate the individual display method for each kind of separated area based on the designating information detected by said designating information detecting unit.

23. A portable terminal as claimed in claim 22, wherein the designating information embedded in the document data is binary data.

24. A portable terminal as claimed in claim 23, wherein:

said designating information detecting unit is operable to detect the binary data of the designating information embedded in the document data for each kind of area of the document data separated by said area separating unit;

said display method designating unit is operable to convert the binary data of the designating information for each kind of separated area into non-binary data representing the display method for each kind of separated area; and said display unit is operable to display each kind of separated area according to the converted non-binary data representing the display method for each kind of separated area, respectively.

25. A portable terminal as claimed in claim 16, further comprising an input unit for receiving an input including at least one of a scroll display instruction for scrolling a portion of the image outputted by said display unit, and a scaling display instruction for scaling a portion of the image outputted by said display unit.

26. A data display method, which uses a portable terminal having a communication function and a data transmission device capable of communicating with the portable terminal and is intended for displaying data transmitted by the data transmission device on the portable terminal, said data display method comprising the steps of:

said data transmission device separating a character area where character data exists and a non-character area where non-character data exists from document data containing character data and non-character data for transmission to said portable terminal;

said data transmission device designating an individual display method for each kind of separated area, according to a designation of the individual display method for each kind of separated area executed by a user, for the display of data at said portable terminal;

said data transmission device adding designating information concerning the designated display method to the document data;

said data transmission device transmitting the document data including the designating information to said portable terminal;

said portable terminal receiving the document data from said data transmission device;

said portable terminal detecting the designating information from the document data; and said portable terminal displaying the document data as an output image based on the detected designating information.

27. A data display method as claimed in claim 26, wherein said step of said data transmission device adding the designating information to the document data comprises replacing a portion of the document data with the designating information to embed the designating information in the document data.

28. A data display method as claimed in claim 27, wherein said step of said data transmission device adding the designating information to the document data comprises replacing a least significant bit of the document data with the designating information to embed the designating information in the document data.

29. A data display method as claimed in claim 27, wherein:
said step of said data transmission device designating an individual display method for each kind of separated area comprises designating the individual display method for each kind of separated area as non-binary data; and
said step of said data transmission device adding the designating information to the document data comprises converting the non-binary data of the designated display method into the designating information as binary data, and adding the converted designating information to the document data by replacing a least significant bit of the document data with the converted designating information.

30. A data display method as claimed in claim 26, wherein said non-character data is photographic or graphic data.

31. A computer readable recording medium storing a data display program for a data transmission device to be used in a system including a portable terminal having a communication function and the data transmission device capable of communicating with the portable terminal, wherein said system is intended for displaying data transmitted by the data transmission device on the portable terminal, said data display program causing the data transmission device to execute a process comprising the steps of:
separating a character area where character data exists and a non-character area where non-character data exists from document data containing character data and non-character data for transmission to said portable terminal;
designating an individual display method for each kind of separated area, according to a designation of the individual display method for each kind of separated area executed by a user, for the display of data at said portable terminal;
adding designating information concerning the designated display method to the document data; and
transmitting the document data including the designating information to said portable terminal.

32. A computer readable recording medium as claimed in claim 31, wherein said adding step comprises adding the designating information to the document data by replacing a portion of the document data to embed the designating information in the document data.

33. A computer readable recording medium as claimed in claim 32, wherein said adding step comprises replacing a least significant bit of the document data with the designating information to embed the designating information in the document data.

34. A computer readable recording medium as claimed in claim 32, wherein:
said designating step comprises designating the individual display method for each kind of separated area as non-binary data; and
said adding step comprises converting the non-binary data of the designated display method into the designating information as binary data, and adding the converted designating information to the document data by replacing a least significant bit of the document data with the converted designating information.

35. A computer readable recording medium storing a data display program for a portable terminal to be used in a system including the portable terminal having a communication function and a data transmission device capable of communicating with the portable terminal, wherein said system is intended for displaying data transmitted by the data transmission device on the portable terminal, said data display program causing the portable terminal to execute a process comprising the steps of:
receiving document data containing character data and non-character data from the data transmission device;
separating a character area where character data exists and a non-character area where non-character data exists from the document data;
designating an individual display method for each kind of separated area according to a designation of the individual display method for each kind of separated area executed by a user; and
displaying the document data as an output image based on the designated display method.

36. A computer readable recording medium as claimed in claim 35, wherein:
the document data received in said receiving step additionally contains designating information replacing a portion of the document data to be embedded therein and concerning a designated display method for displaying the document data according to the designation by the user;
said process executed by said data display program further comprises the step of detecting the designating information embedded in the document data embedded in the document data is binary data; and
said designating step comprises designating the individual display method for each kind of separated area based on the detected designating information.

37. A computer readable recording medium as claimed in claim 36, wherein:
the designating information embedded in the document data is binary data;
said detecting step comprises detecting the binary data of the designating information embedded in the document data for each kind of area of the document data separated in said separating step;
said designating step comprises converting the binary data of the detected designating information for each kind of separated area into non-binary data representing the display method for each kind of separated area; and
said displaying step comprises displaying each kind of separated area according to the converted non-binary data representing the display method for each kind of separated area, respectively.

38. A computer readable recording medium as claimed in claim 35, wherein said non-character data is photographic or graphic data.

\* \* \* \* \*